United States Patent
Kwong et al.

(10) Patent No.: US 12,288,367 B2
(45) Date of Patent: Apr. 29, 2025

(54) POINT CLOUD GEOMETRY COMPRESSION

(71) Applicant: City University of Hong Kong, Kowloon (HK)

(72) Inventors: Sam Tak Wu Kwong, Kowloon (HK); Xinju Wu, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 107 days.

(21) Appl. No.: 18/363,169

(22) Filed: Aug. 1, 2023

(65) Prior Publication Data
US 2025/0045970 A1 Feb. 6, 2025

(51) Int. Cl.
*G06T 9/00* (2006.01)

(52) U.S. Cl.
CPC .............. *G06T 9/001* (2013.01); *G06T 9/002* (2013.01)

(58) Field of Classification Search
CPC .. H04N 19/107; H04N 19/137; H04N 19/172; H04N 19/51; H04N 19/537; H04N 19/593; H04N 19/105; H04N 19/513; H04N 19/70; G06N 3/044; G06N 3/045; G06N 3/047; G06N 3/08; G06N 3/0455
See application file for complete search history.

(56) References Cited

U.S. PATENT DOCUMENTS

| | | | | |
|---|---|---|---|---|
| 8,897,370 B1 * | 11/2014 | Wang | ...................... | H04N 19/59 375/240.2 |
| 2011/0090957 A1 * | 4/2011 | Liao | ...................... | H04N 19/176 375/E7.243 |

(Continued)

FOREIGN PATENT DOCUMENTS

| | | |
|---|---|---|
| CN | 110349230 A | 10/2019 |
| CN | 113613010 A | 11/2021 |

(Continued)

OTHER PUBLICATIONS

W. Yang, Z. Chen, C. Chen, G. Chen, and K.K. Wong, "Deep face video in painting via UV mapping," IEEE Trans. Image Process., vol. 32, pp. 1145-1157, 2023.

(Continued)

*Primary Examiner* — Ming Wu
(74) *Attorney, Agent, or Firm* — Renner, Kenner, Greive, Bobak, Taylor & Weber

(57) ABSTRACT

A method for learning-based point cloud geometry compression includes: given a source point cloud, regressing an aligned mesh that is driven by a set of parameters from a deformable template mesh, quantizing the set of parameters into a parameter bitstream, generating an aligned point cloud from the quantized parameters by mesh manipulation and mesh-to-point-cloud conversion, extracting features from both the source point cloud and the aligned point cloud based on sparse tensors including coordinates and features, the coordinates being encoded into a coordinate bitstream, warping the features of the aligned point cloud onto the coordinates of the source point cloud, obtaining residual features through feature subtraction, processing the residual features using an entropy model into a residual feature bitstream, and obtaining a reconstructed point cloud by processing the parameter bitstream, the coordinate bitstream and the residual feature bitstream.

14 Claims, 18 Drawing Sheets

(56) References Cited

U.S. PATENT DOCUMENTS

| | | | |
|---|---|---|---|
| 2014/0049607 A1* | 2/2014 | Amon | H04N 19/182 348/43 |
| 2018/0038146 A1* | 2/2018 | Linden | B60J 1/08 |
| 2023/0075442 A1 | 3/2023 | Ma et al. | |

FOREIGN PATENT DOCUMENTS

| | | |
|---|---|---|
| CN | 114373023 A | 4/2022 |
| CN | 115393452 A | 11/2022 |

OTHER PUBLICATIONS

J. Lin, Y. Yuan, T. Shao, and K. Zhou, "Towards high-fidelity 3d face reconstruction from in-the-wild images using graph convolutional networks," in IEEE Int. Conf. Comput. Vision Pattern Recognit. (CVPR), 2020, pp. 5890-5899.

F. Wimbauer, S. Wu, and C. Rupprecht, "De-rendering 3d objects in the wild," in IEEE Int. Conf. Comput. Vision Pattern Recognit. (CVPR), 2022, pp. 18469-18478.

S. Wu, C. Rupprecht, and A. Vedaldi, "Unsupervised learning of probably symmetric deformable 3d objects from images in the wild," in IEEE Int. Conf. Comput. Vision Pattern Recognit. (CVPR), 2020, pp. 1-10.

B. Chen, Z. Wang, B. Li, S. Wang, S. Wang, and Y. Ye, "Interactive face videocoding: A generative compression framework," arXiv:2302.09919, 2023.

R. Hanocka, G. Metzer, R. Giryes, and D. Cohen-Or, "Point2mesh: a self-prior for deformable meshes," ACM Trans. Graph., vol. 39, No. 4, p. 126, 2020.

X. Wei, Z. Chen, Y. Fu, Z. Cui, and Y. Zhang, "Deep hybrid self-prior for full 3d mesh generation," in IEEE/CVFInt. Conf. ComputerVision (ICCV), 2021, pp. 5785-5794.

D. Smirnov, M. Bessmeltsev, and J. Solomon, "Learning manifold patch-based representations of man-made shapes," in 9th Int. Conf. Learn. Representations (ICLR), 2021.

M. Loper, N. Mahmood, J. Romero, G. Pons-Moll, and M.J. Black, "SMPL: a skinned multi-person linear model," ACM Trans. Graph., vol. 34, No. 6, pp. 248:1-248:16, 2015.

C. Xu, Y. Makihara, X. Li, and Y. Yagi, "Occlusion-aware human mesh model-based gait recognition," IEEE Trans. Inf. Forensics Secur.,vol. 18, pp. 1309-1321,2023.

C.R. Qi, L. Yi, H. Su, and L.J. Guibas, "Pointnet++: Deep hierarchical feature learning on point sets in a metrics pace," in Conf. NeuralInf. Process. Syst. (NeurIPS), 2017, pp. 5099-5108.

B. Graham, M. Engelcke, and L. van der Maaten, "3d semantic segmentation with submanifold sparse convolutional networks," in IEEE Int. Conf. Comput. Vision Pattern Recognit. (CVPR), 2018, pp. 9224-9232.

C.B. Choy, J. Gwak, and S. Savarese, "4d spatio-temporal convnets: Minkowski convolutional neural networks," in IEEE Int. Conf. Comput. Vision Pattern Recognit. (CVPR), 2019, pp. 3075-3084.

J. Gwak, C.B. Choy, and S. Savarese, "Generative sparse detection networks for 3d single-shot object detection," in 16th EuropeonConf. ComputerVision (ECCV), vol. 12349, 2020, pp. 297-313.

D. Minnen, J. Balle, and G. Toderici, "Joint autoregressive and hierarchical priors for learned image compression," in Conf. Neural Inf. Process. Syst. (NeurIPS), 2018, pp. 10794-10803.

Y. Xu, Y. Lu, and Z. Wen, "Owlii dynamic human mesh sequence dataset," ISO/IECJTC1/SC29WG11, Macau, Tech. Rep. M41658, Oct. 2017.

T. Yu, Z. Zheng, K. Guo, p. Liu, Q. Dai, and Y. Liu, "Function 4d: Real-time human volumetric capture from very sparse consumer RGBD sensors," in IEEE Int. Conf. Comput. Vision Pattern Recognit. (CVPR), 2021, pp. 5746-5756.

M. Krivokuca, P.A. Chou, and P. Savill, "8i voxelized surface light field (8iVSLF) dataset," ISO/IECJTC1/SC29WG11, Ljubljana, Tech. Rep. M42914, Jul. 2018.

3DG, "Common test conditions for V3C and V-PCC," ISO/IECJTC1/SC29/WG11, Tech. Rep. N19518, Jul. 2020.

3DG, "Common test conditions for G-PCC," ISO/IECJTC1/SC29/WG 11, Tech. Rep. N19584, Jul. 2020.

Zuo, Xinxin and Wang, Sen and Sun, Qiang and Gong, Minglun and Cheng, Li, "Self-Supervised 3D Human Mesh Recovery from Noisy Point Clouds," arXiv: 2107.07539, 2022.

E.d'Eon, B. Harrison, T. Myers, and P.A.Chou, "8ivoxelizedfull bodies (avoxelizedpointclouddataset)," ISO/IECJTC1/SC29/WG11,Geneva,Tech.Rep. M40059/M74006, Jan. 2017.

D.Graziosi, O.Nakagami, S.Kuma, A.Zaghetto, T.Suzuki, and A.Tabatabai, "An overview of ongoing point cloud compression standardization activities: Video-based (V-PCC) andgeometry-based (G-PCC)," APSIPATrans. SignalInf. Process. vol. 9, p. e13, 2020.

S. Schwarz, M. Preda, V. Baroncini, M. Budagavi, P. Cesar, P. A. Chou, R.A. Cohen, M. Krivokuca, S. Lasserre, Z. Li, J. Llach, Mammou,R. Mekuria, O. Nakagami, E. Siahaan, A.J. Tabatabai, .M. Tourapis, and V. Zakharchenko, "Emerging mpeg standards for point cloud compression," IEEE J .Emerg. Sel. Topics Circuits Syst., vol. 9, No. 1, pp. 133-148, 2019.

MPEG 3D Graphics Coding, "V-PCC codec description," ISO/IEC JTC 1/SC29/WG7, Tech.Rep. N00100, Oct. 2020.

MPEG3D Graphics Coding, "G-PCC codec description," ISO/IEC JTC 1/SC29/WG7, Tech.Rep. N0099, Apr. 2021.

G.J. Sullivan, J. Ohm, W. Han, and T. Wiegand, "Overview of the high efficiency video coding (HEVC) standard," IEEE Trans. Circuits Syst. Video Technol., vol. 22, No. 12, pp. 1649-1668, 2012.

J. Balle, V. Laparra, and E. P. Simoncelli, "End-to-end optimized image compression," in 5th Int. Conf. Learn. Representations (ICLR), 2017.

J. Balle, D. Minnen, S. Singh, S. J. Hwang, and N. Johnston, "Variational image compression with a scale hyperprior," in 6th Int. Conf. Learn. Representations (ICLR), 2018.

M. Quach, G. Valenzise, and F. Dufaux, "Learning convolutional transforms for lossy point cloud geometry compression," inIEEEInt. Conf. Image Process. (ICIP), 2019, pp. 4320-4324.

J. Wang, D. Ding, Z. Li, and Z. Ma, "Multi scale point cloud geometry compression," in 31st Data Compression Conf. (DCC), 2021, pp. 73-82.

J. Wang, D. Ding, Z. Li, X. Feng, C. Cao, and Z. Ma, "Sparse tensor-based multiscale representation for point cloud geometry compression," IEEETrans. Pattern Anal. Mach. Intell., pp. 1-18, 2022.

R. Mekuria, K. Blom, and P. Cesar, "Design, implementation, and evaluation of a point cloud codec for tele-immersive video," IEEE Trans. Circuits Syst. Video Technol., vol. 27, No. 4, pp. 828-842, 2016.

E. Ramalho, E. Peixoto, and E. Medeiros, "Silhouette 4d with context selection: Lossless geometry compression of dynamic point clouds," IEEE Signal Process. Letters, vol. 28, pp. 1660-1664, 2021.

E. Peixoto, "Intra-frame compression of point cloud geometry using dyadic decomposition," IEEE Signal Process. Letters, vol. 27, pp. 246-250, 2020.

X. Zhang, W. Gao, and S. Liu, "Implicit geometry partition for point cloud compression," in Data Compression Conf. (DCC), 2020, pp. 73-82.

C. Wang, W. Zhu, Y. Xu, Y. Xu, and L. Yang, "Point-voting based point cloud geometry compression," in 23rd Int. Workshop Multimedia Signal Process. (MMSP), 2021, pp. 1-5.

A. Ahmmed, M. Paul, M. M. Murshed, and D. Taubman, "Dynamic point cloud geometry compression using cuboid based commonality modeling framework," in 2021 IEEE Int. Conf. Image Process. (ICIP), 2021, pp. 2159-2163.

L. Li, Z. Li, S. Liu, and H. Li, "Efficient projected frame padding for video-based point cloud compression," IEEE Trans. Multimedia, vol. 23, pp. 2806-2819, 2021.

L. Li, Z. Li, V. Zakharchenko, J. Chen, and H. Li, "Advanced 3d motion prediction for video-based dynamic point cloud compression," IEEE Trans. Image Process., vol. 29, pp. 289-302, 2020.

(56) References Cited

OTHER PUBLICATIONS

J. Xiong, H. Gao, M. Wang, H. Li, K. N. Ngan, and W. Lin, "Efficient geometry surface coding in v-pcc," IEEE Trans. Multimedia, pp. 1-1, 2022.

P. de Oliveira Rente, C. Brites, J. Ascenso, and F. Pereira, "Graph-based static 3d point clouds geometry coding," IEEE Trans. Multimedia, vol. 21, No. 2, pp. 284-299, 2019.

W. Zhu, Y. Xu, D. Ding, Z. Ma, and M. Nilsson, "Lossy point cloud geometry compression via region-wise processing," IEEE Trans. Circuits Syst. Video Technol., vol. 31, No. 12, pp. 4575-4589, 2021.

W. Zhu, Z.Ma, Y.Xu, L.Li, and Z.Li, "View-dependent dynamic point cloud compression," IEEE Trans. Circuits Syst. Video Technol. ,vol. 31, No. 2, pp. 765-781,2021.

M. Krivokuca, P.A. Chou, and M. Koroteev, "A volumetric approach to point cloud compression, part II: geometry compression," IEEE Trans. Image Process., vol. 29, pp. 2217-2229, 2020.

R.L. de Queiroz and P.A. Chou, "Motion-compensated compression of dynamic voxelized point clouds," IEEE Trans. Image Process., vol. 26, No. 8, pp. 3886-3895, 2017.

D.C. Garcia, T.A. da Fonseca, R.U. Ferreira, and R.L. de Queiroz, "Geometry coding for dynamic voxelized point clouds using octrees and multiple contexts," IEEE Trans. Image Process., vol. 29, pp. 313-322, 2020.

D. Thanou, P.A. Chou, and P. Frossard, "Graph-based compression of dynamic 3d point cloud sequences," IEEE Transs. Image Process. vol. 25, No. 4, pp. 1765-1778, 2016.

L. Huang, S. Wang, K. Wong, J. Liu, and R. Urtasun, "Octsqueeze: Octree-structured entropy model for lidar compression," in IEEE Int. Conf. Comput. Vision Pattern Recognit. (CVPR), 2020, pp. 1310-1320.

Z. Que, G. Lu, and D. Xu, "Voxelcontext-net: An octree based framework for point cloud compression," in IEEE Int. Conf. Comput. Vision Pattern Recognit. (CVPR), 2021, pp. 6042-6051.

C. Fu, G. Li, R. Song, W. Gao, and S. Liu, "Octattention: Octree-based large-scale contexts model for point cloud compression," in 36th AAAI Conf. Artif. Intell. (AAAI), 2022, pp. 625-633.

T. Fan, L. Gao, Y. Xu, D. Wang, and Z. Li, "Multiscale latent-guided entropy model for lidar point cloud compression," arXiv:2209. 12512, 2022.

S. Biswas, J. Liu, K. Wong, S. Wang, and R. Urtasun, "Muscle: Multi sweep compression of lidar using deepen tropy models," in Conf. Neural Inf. Process. Syst. (NeurIPS), 2020.

Z. Hu, G. Lu, and D. Xu, "FVC: A new framework towards deep video compression in feature space," in IEEE Int. Conf. Comput. Vision Pattern Recognit. (CVPR), 2021, pp. 1502-1511.

G. Lu, W. Ouyang, D. Xu, X. Zhang, C.Cai, and Z.Gao, "DVC:anend-to-end deep video compression framework," in IEEE Int. Conf. Comput. Vision Pattern Recognit. (CVPR), 2019, pp. 11006-11015.

M. Quach, G. Valenzise, and F. Dufaux, "Improved deep point cloud geometry compression," in 22nd Int. Workshop Multimedia Signal Process. (MMSP), 2020, pp. 1-6.

D.T. Nguyen, M. Quach, G. Valenzise, and P. Duhamel, "Learning-based lossless compression of 3d point cloud geometry," in IEEE Int. Conf. Acoustics Speech Signal Process. (ICASSP), 2021, pp. 4220-4224.

D.T. Nguyen, M. Quach, Giuseppe Valenzise, and P. Duhamel, "Multi-scale deep context modeling for lossless point cloud geometry compression," in IEEE Int. Conf. Multimedia Expo Workshops (ICMEW), 2021, pp. 1-6.

A.F.R. Guarda, N.M.M. Rodrigues, and F. Pereira, "Deep learning-based point cloud geometry coding with resolution scalability," in 22nd Int. Workshop Multimedia Signal Process.(MMSP), 2020, pp. 1-6.

A.F.R. Guarda, N.M.M. Rodrigues, and F. Pereira, "Point cloud geometry scalable coding with a single end-to-end deep learning model," in IEEE Int. Conf. Image Process. (ICIP), 2020, pp. 3354-3358.

A.F.R. Guarda, N.M.M. Rodrigues, and F. Pereira, "Deep learning-based point cloud geometry coding: RD control through implicit and explicit quantization," in IEEE Int. Conf. Image Process. (ICIP), 2020, pp. 3354-3358.

S. Milani, "ADAE: adversarial distributed source auto encoder for point cloud compression," in IEEE Int. Conf. Image Process. (ICIP), 2021, pp. 3078-3082.

J. Wang, H. Zhu, H. Liu, and Z. Ma, "Lossy point cloud geometry compression via end-to-end learning," IEEE Trans. Circuits Syst. Video Technol., vol. 31, No. 12, pp. 4909-4923, 2021.

A. Brock, T. Lim, J.M. Ritchie, and N. Weston, "Generative and discriminative voxel modeling with convolutional neural networks," arXiv: 1608.04236, 2016.

R. Xue, J. Wang, and Z.Ma, "Efficient lidar point cloud geometry compression through neighborhood point attention," arXiv:2208. 12573, 2022.

Z. Liang and F. Liang, "Transpcc: Towards deep point cloudc ompression via transformers," in ICMR'22: International Conference on Multimedia Retrieval, Newark, NJ, USA, Jun. 27-30, 2022, 2022, pp. 1-5.

Y. He, X. Ren, D. Tang, Y. Zhang, X. Xue, and Y. Fu, "Density-preserving deep point cloud compression," in IEEE Int. Conf. Comput. Vision Pattern Recognit. (CVPR), 2022, pp. 2323-2332.

M.A.A. Muzaddid and W.J. Beksi, "Variable rate compression for raw 3d point clouds," in Int. Conf. Robot. Autom. (ICRA), 2022, pp. 8748-8755.

K. You and P. Gao, "Patch-based deep auto encoder for point cloud geometry compression," in ACM Multimedia Asia, 2021, pp. 30:1-30:7.

A. Akhtar, Z. Li, and G.V. der Auwera, "Inter-frame compression for dynamic point cloud geometry coding," arXiv: 2207.12554, 2022.

T. Fan, L. Gao, Y. Xu, Z. Li, and D. Wang, "D-DPCC: deep dynamic point cloud compression via 3d motion prediction," in 31st Int. Joint Conf. Artif. Intell. (IJCAI), 2022, pp. 898-904.

\* cited by examiner

POINT CLOUD GEOMETRY COMPRESSION

TECHNICAL FIELD

The present invention generally relates to methods and systems for point cloud geometry compression. In particular, the present invention relates to methods and systems for geometric prior based deep point cloud geometry compression.

BACKGROUND

Recent years have witnessed unprecedented growth in the demand and development of Extended Reality (XR) and Metaverse, which brings benefits to applications such as virtual social, online education, e-commerce, tourism, and exhibition. Metaverse provides users with a collective virtual shared space where users can incarnate into digital avatars to communicate and interact with others. In parallel, three-dimensional (3D) acquisition devices like RGBD cameras, 3D scanners, and LiDAR have become increasingly precise and cost-effective, which caters to the need to handily create digital twin that has a realistic shape and appearance with the physical human. While meshes have traditionally been used to create virtual human models, they can be expensive and time-consuming to generate, particularly for detailed and lifelike models. An efficient and versatile alternative to represent humans is point clouds, allowing for more accessible and accurate 3D scanning and modeling of human bodies and faces with intricate details.

A point cloud is a collection of 3D data points that embody the surface geometry of an entity, typically captured through hardware devices such as LiDAR or photogrammetry by RGBD cameras. Each point of a point cloud encompasses a coordinate in 3D space, with additional information such as color, normal, intensity, and/or reflectance. To satisfy the requirements of high fidelity with a high level of details, point clouds generally contain huge amount of spatial data. For instance, a high-resolution point cloud of a full-body human from 8i's dataset [1] contains 765,000 3D points, each comprising a 30-bit coordinate (x, y, z) and 24-bit color information (r, g, b) in total, resulting in a storage size of 11 MBytes for a point cloud. Considering a dynamic human point cloud sequence of 300 frames, it would occupy a storage space of approximately 3 GBytes to display a 10-second volumetric video. The overwhelming data volume poses incredible challenges to the processing, transmission, and storage of high-quality point clouds.

Point Cloud Compression (PCC) techniques are known. Traditional PCC methods developed by the Moving Picture Experts Group (MPEG) [2], [3] can be categorized into Video-based PCC (V-PCC) [4] for dynamic point clouds and Geometry-based PCC (G-PCC) [5] for static point clouds. V-PCC [4] projects point clouds into two-dimensional (2D) planes and utilizes the hybrid video coding standard (e.g., High Efficiency Video Coding [6]) for compression. G-PCC [5] utilizes octree coding, trisoup coding, and predictive coding for geometry compression, while leverages region adaptive hierarchical transform and lifting transform for attribute compression. On the other hand, deep learning based techniques have been successfully applied to PCC, leveraging the end-to-end training methodology [7], [8]. These approaches typically rely on autoencoder architecture, which includes an encoder of stacked downscaling blocks to compress the source point clouds into a compact latent code, and a decoder of upscaling blocks to reconstruct the original point sets from the latent code. The neural networks are trained towards the optimization of the rate-distortion (RD) performance. These techniques have shown improvements for point cloud geometry and attribute compression by enabling the identification and prioritization of critical features.

SUMMARY OF THE INVENTION

According to an aspect of the invention, there is provided a method for learning-based point cloud geometry compression, which includes given a source point cloud, regressing an aligned mesh that is driven by a set of parameters from a deformable template mesh, quantizing the set of parameters into a parameter bitstream, generating an aligned point cloud from the quantized parameters by mesh manipulation and mesh-to-point-cloud conversion, extracting features from both the source point cloud and the aligned point cloud based on sparse tensors comprising coordinates and features, the coordinates being encoded into a coordinate bitstream, warping the features of the aligned point cloud onto the coordinates of the source point cloud, obtaining residual features through feature subtraction, processing the residual features using an entropy model into a residual feature bitstream, and obtaining a reconstructed point cloud by processing the parameter bitstream, the coordinate bitstream and the residual feature bitstream.

In some embodiments, generating the aligned point cloud may include recovering the aligned mesh from the quantized parameters in the mesh manipulation, and processing the aligned mesh by mesh-to-point-cloud conversion.

In some embodiments, extracting the features from both the source point cloud and the aligned point cloud may include using stacked downsampling blocks.

In some embodiments, each downsampling block may include a strided convolution unit, a Voxception-ResNet (VRN) unit, and another convolution layer, arranged in a cascading manner.

In some embodiments, using the stacked downsampling blocks may output multiscale sparse tensors.

In some embodiments, the feature extraction and the feature warping can be applied in a plug-and-play fashion with one or more methods.

In some embodiments, the one or more methods for the feature extraction and the feature warping may include a method based on a deep point cloud compression using sparse convolution.

In some embodiments, obtaining the residual features may include subtracting the warped features of the aligned point cloud from the features of the source point cloud to obtain the residual features.

In some embodiments, processing the residual features may include compressing the residual features by vector quantization on original signal space and estimating the entropy of the residual features.

In some embodiments, obtaining the reconstructed point cloud may include decoding the parameter bitstream to use the set of parameters to manipulate the template mesh, producing an aligned point cloud by mesh-to-point-cloud conversion from a reconstructed aligned mesh, predicting features from the aligned point cloud, warping the predicted features onto a decoded set of coordinates corresponding to skeleton points of a source point cloud, decoding the residual feature bitstream to the residual features, and adding the residual features to the obtained warped features to recover the features of the source point cloud.

In some embodiments, obtaining the reconstructed point cloud may further include conducting feature propagation on the recovered features of the source point cloud to upscale the points close to the source point cloud.

In some embodiments, conducting the feature propagation may include employing a transposed convolution layer with a two-stride in each upsampling block to upscale an input coordinate set while retaining its sparsity pattern.

In another aspect of the invention, there is provided a system for learning-based point cloud geometry compression, which includes one or more processors, and memory storing one or more programs configured to be executed by the one or more processors, the one or more programs including instructions for performing or facilitating performing of the method as aforementioned.

In yet another aspect of the invention, there is provided a non-transitory computer readable medium having instructions stored thereon which, when executed by one or more processors, cause the one or more processors to execute the method as aforementioned.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF DRAWINGS

Embodiments of the invention will now be described, by way of example, with reference to the accompanying drawings, in which:

FIG. 6B: sequences "basketball-player" and "dancer"; FIG. 6C: sequences "exercise" and "model"; FIG. 6D: sequences "0220" and "0420"; FIG. 6E: sequence "0520")

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
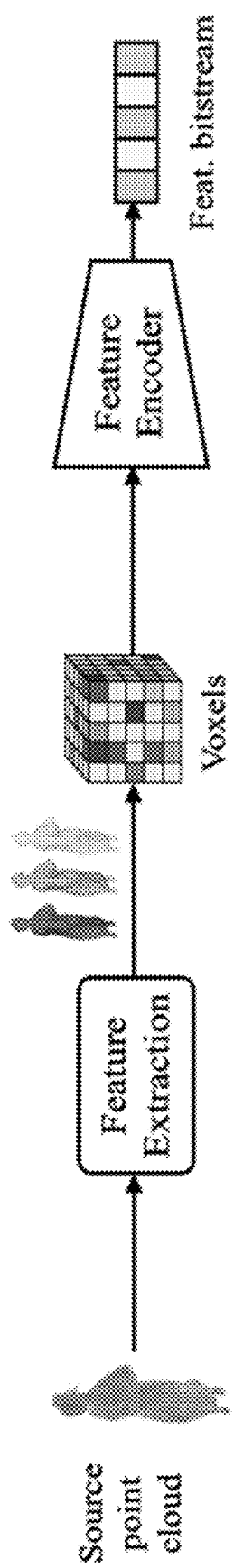
FIG. 1A shows an example human point cloud geometry compression paradigm according to one existing approach.
Figure 1B:
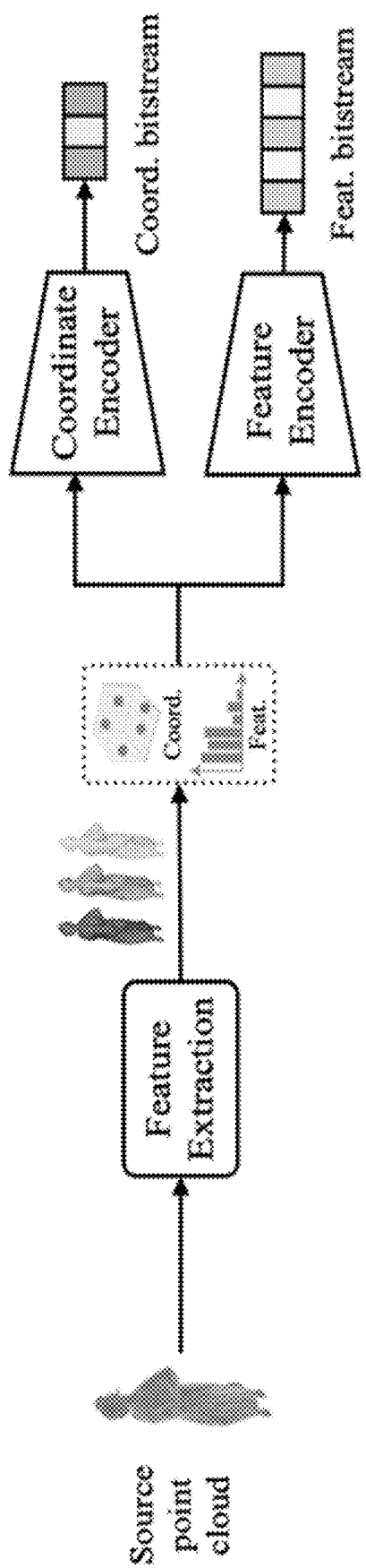
FIG. 1B shows an example human point cloud geometry compression paradigm according to one existing approach.

Despite the demonstrated success in learning-based point cloud compression [9]-[11], existing point cloud compression techniques typically ignore prior knowledge of the object. FIGS. 1A and 1B illustrate some existing human point cloud geometry compression paradigms. These existing paradigms directly preserve informative geometric features by the feature extraction module, such as compressing features based on 3D voxels (FIG. 1A) or compressing coordinates and features individually (FIG. 1B).

Figure 1C:
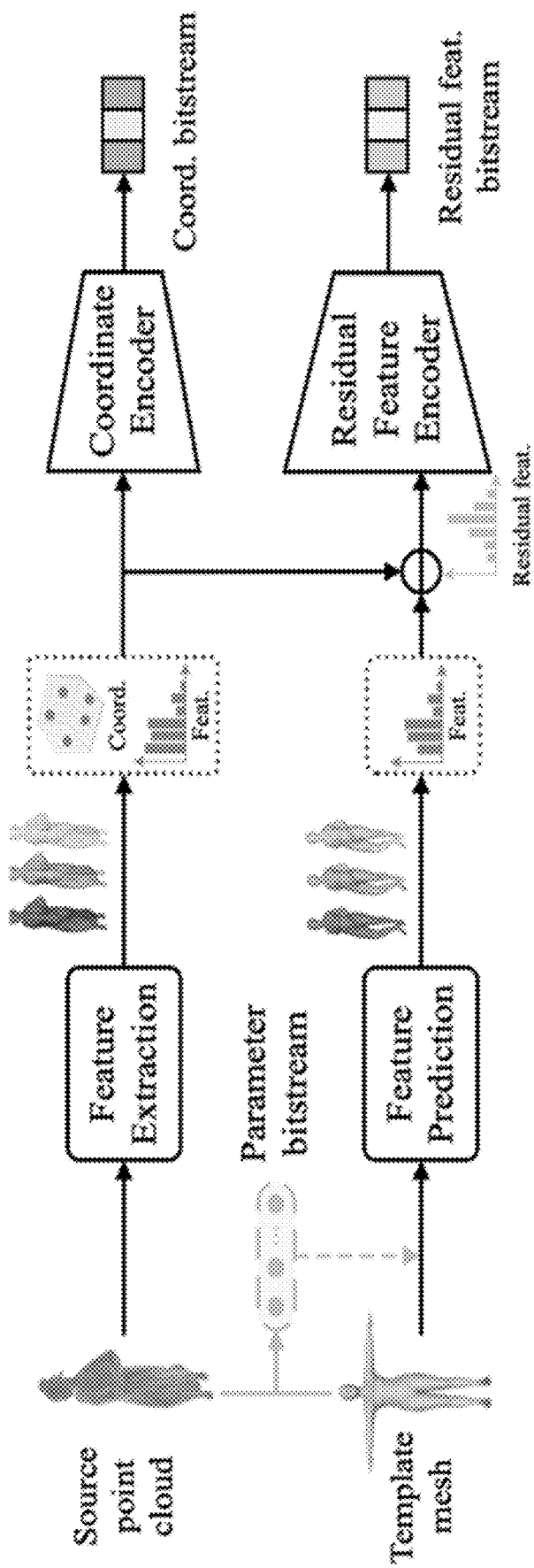
FIG. 1C shows a human point cloud geometry compression paradigm according to some embodiments of the invention.

Inventors of the present invention have devised that some objects or subjects possess regular structures that can be leveraged as explicit prior knowledge in compressing high-resolution point clouds. For example, human or animal bodies possess regular structures that can be leveraged as explicit prior knowledge in compressing high-resolution human or animal point clouds. Some embodiments of the invention provide a deep point cloud (e.g., human/animal point cloud) geometry compression framework based on an explicit geometric prior, which provides hard topological restrictions as an initialization of geometry. FIG. 1C illustrate one example of such framework. Some embodiments of the invention incorporate geometric priors to remove the redundancy at the feature level, followed by residual feature compression, yielding better compression performance. Some embodiments of the invention utilize a set of parameters with only a few bits to drive a geometric prior model, enhancing point cloud geometry compression.

Some embodiments of the invention provide a geometric prior based point cloud geometry compression framework, in which point clouds (e.g., human/animal point clouds) can be compressed as the combination of a geometric prior and structure variations. Based on the prior at the feature level, the redundancy is reduced or substantially reduced to improve the coding performance.

Some embodiments of the invention provide a 3D parametric model for PCC that endows topological constraints as an initialization for effective deep feature coding. This hybrid approach combines the strengths of both mesh and point cloud representations, such that the representation with fewer bits while flexible in representing complex shapes and fine-grained details can be achieved.

Some embodiments of the invention can be implemented in a plug-and-play manner in point cloud geometry compression.

Hereinafter, some embodiments of the invention will be described in detail with reference to the drawings.

Inventors of the present invention have, through their research, become aware of traditional point cloud geometry compression techniques.

For example, the division of the point cloud based on an octree has been adopted in conventional approaches for compressing point cloud geometry, where only non-empty nodes among eight children continue to be subdivided. Mekuria et al. [12]proposes a hybrid time-varying point cloud codec that serves as the anchor for MPEG PCC [2], [3]. In this codec, each intra-frame is progressively coded in the octree subdivision using 8-bit occupancy codes, while inter-frame redundancy is eliminated using the rigid transformation of 3D macroblocks in the octree voxel space. The MPEG has also developed the prevailing G-PCC and V-PCC standards [2], [3]. G-PCC [4] relies on three techniques for geometry compression, including octree coding, trisoup coding, and predictive coding. Octree coding employs several modes to predict compact occupancy codes for isolated nodes, planes, and patterned regions, followed by an arithmetic coding engine. Trisoup coding aims to achieve lossy compression by using a pruned octree for surface reconstruction and resampling. Predictive coding targets at large-scale LiDAR point clouds in low latency cases by pointwise prediction in tree-based traversal. By contrast, V-PCC [5] adopts another line of compression by projecting 3D patches of point clouds onto the surfaces of a bounding box using 3D-to-2D projection, thus allowing for the reuse of existing video codecs [6]. The projection result of the geometry component is 2D depth maps where each value represents the distance between each point and the projection plane.

Various techniques have also been proposed to improve the geometry coding performance of both G-PCC and V-PCC. Specifically, for G-PCC [4], Silhouette decomposition [13], Dyadic decomposition [14], quad-tree and binary-tree partitions [15], and triangle construction [16] are used to enhance octree coding and trisoup coding. For V-PCC [5], block partitioning [17], frame padding [18], and motion prediction [19] are employed, along with the optimization on geometric error projection based rate-distortion optimization (RDO) [20]. Additionally, coding approaches detached from MPEG PCC [2], [3] have also been explored. For instance, Oliveira et al. [21] employs a graph-based transform for the enhancement layer and an octree-based approach for the base layer. Furthermore, Zhu et al. exploits region similarity [22] and view-dependent projection [23], while Krivokuća et al. [24] introduces volumetric functions for geometry compression. In inter-frame compression, various methods for 3D motion compensation [25], [26] and context-based arithmetic coding [27] have also been investigated.

Inventors of the present invention have, through their research, further realized that there has been a surge of interest in learning-based point cloud geometry compression techniques. One direction for learning-based point cloud geometry compression is the development of an efficient entropy model that leverages context, primarily for large-scale point clouds. Huang et al. [28]proposes a conditional entropy model with multiple ancestor nodes in the octree representation, whereas Que et al. [29] develops VoxelContext-Net, which utilizes information from neighboring octree nodes at the same depth level to improve local voxel context. Fu et al. [30] utilizes sibling nodes to expand context and an attention mechanism to emphasize key nodes, while children of sibling nodes and surface prior are further investigated in [31]. For dynamic cases, Biswas et al. [32]proposes an approach that models the probability of octree symbols and intensity values by exploiting spatial and temporal redundancy between successive LiDAR point clouds.

Another direction for learning-based point cloud geometry compression involves downsampling points in the encoder and recovering them in the decoder, extending end-to-end image [7], [8] or video [33], [34] compression techniques. Several methodologies in learning-based PCC, such as voxelization followed by 3D convolution, sparse convolution, and multi-layer perceptron (MLP), have been explored. For example, Quach et al. [9], [35] and Nguyen et al. [36], [37] converts point clouds into 3D grids using voxelization and represents each voxel with an occupied or unoccupied state. Guarda et al. explores learning-based scalable coding for geometry [38], [39] and obtains multiple RD points from a trained model using explicit quantization of the latent representation [40]. Milani [41] introduces an adversarial autoencoding strategy to train the encoder. Wang et al. [42]proposes the PCGC framework, which includes preprocessing, autoencoder, and post-processing modules, and uses Voxception-ResNet (VRN) [43] within the stacked unit and a hyperprior entropy model [8]. As a representative of sparse convolution based methods, a multiscale framework, PCGCv2, is proposed by Wang et al. [10] based on sparse tensors to avoid processing of massive empty voxels. To further improve the efficiency, a more elaborate structure with downscaling and upscaling in each scale is developed to calculate occupancy probability [11], and this technique has been applied in LiDAR point clouds through neighborhood point attention [44]. PointNet-based methods [45]-[48] for point cloud compression employ set abstraction layers to extract local features, drawing inspiration from classification and segmentation tasks. More specifically, self-attention layers in Transformer have been introduced by Liang et al. [45]. Furthermore, density, local positions, and ancestor embeddings can be utilized to preserve local density information [46]. Regarding inter-frame compression, Akhtar et al. [49] utilizes sparse convolution to map the latent code of the previous frame to the coordinates of the current frame. Meanwhile, Fan et al. [50]proposes a multiscale motion flow fusion module for motion estimation and developed an adaptive weighted interpolation algorithm to further enhance motion estimation accuracy.

Inventors of the present invention are aware that some learning-based point cloud geometry compression techniques commonly ignore the prior knowledge of the source 3D model, resulting in geometric redundancy during the compression process. Inventors of the present invention have devised that incorporating prior knowledge into the source 3D model, such as its geometric properties, topology, and/or semantic information, can improve the coding efficiency.

Inventors of the present invention have, through their research, further learned about representations from 3D priors. Specifically, inventors of the present invention are aware that substantial attempts have been made to retain explicit 3D geometric priors for 2D processing. Yang et al. [51] manipulates a 3D morphable model as the face prior to transform a face between image space and UV texture space, which benefits image inpainting. Other techniques explored include: the enhancement of single-view images in the wild by concatenating regressed 3D shapes from 2D facial images and decoded results from face embedding [52], or decomposing human and object images into 3D representations such as depth, normals, and albedo [53], [54]. In relation to compression, Chen et al. [55]proposes an interactive face video coding framework that converts inter frames into 3D meshes and re-projects them in the decoder, demonstrating promising performance in ultra-low bitrate face communications.

For 3D processing, various methods have been developed to leverage 3D geometric prior information. Self-prior [56], [57] is utilized to model repeating geometric structures and leverage self-correlation across multiple scales with fine-grained details. In [58], a parameterized 3D representation of Coons patches is used to represent a 3D object, which is optimized iteratively based on a deformable parameterized template model with a minimal number of control points. For human data, the skinned multi-person linear model (SMPL) [59] is an expressive 3D full-body template model that can be utilized as a 3D prior. In [60], the predicted parameters from the SMPL model are fed to a recognition module for improved pose estimation. Inventors of the present invention have devised that incorporating 3D priors in point cloud compression may be useful and beneficial.

Methodology in some embodiments of the invention is now presented.

A. Overview

Figure 2:
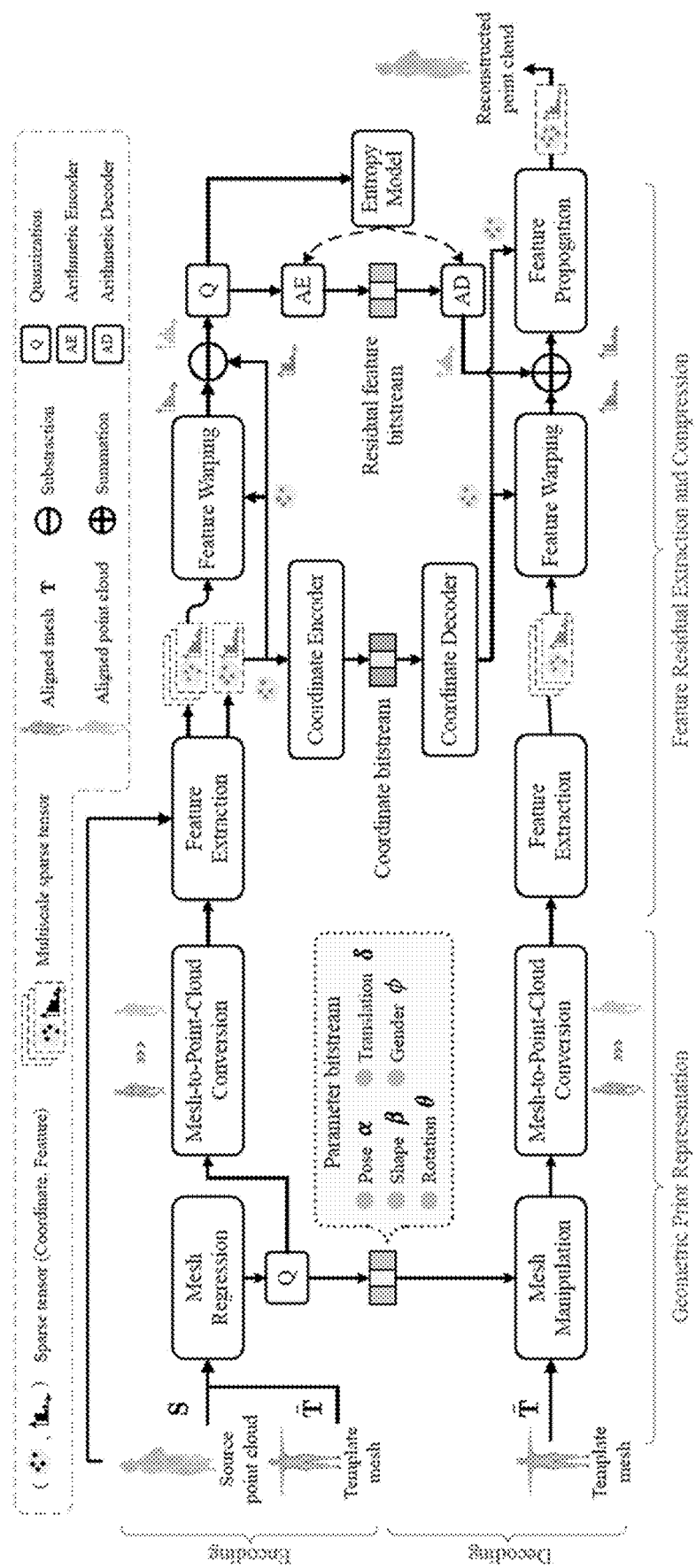
FIG. 2 shows a schematic illustration of a framework including a two-stage process for geometric prior representation and feature residual compression according to some embodiments of the invention.

Some embodiments of the invention provide a learning-based human point cloud geometry compression approach that leverages the human geometric priors to improve the compression performance. FIG. 2 shows an example architecture of the proposed scheme in some embodiments. As shown in FIG. 2, the scheme involves a two-stage process for geometric prior representation and feature residual compression. Given a source point cloud S, an aligned mesh T that can be driven by a set of parameters from a deformable template mesh T is regressed first. During encoding, these parameters are further quantized into a compact bitstream, allowing for the manipulation of the template mesh's pose and shape during decoding. Regarding the next stage, features are extracted from both the source point cloud and an aligned point cloud based on the sparse tensors that comprise of coordinates and features. Then the features of the aligned point cloud are warped onto the coordinates of the source point cloud, subsequently calculating feature residuals. These residuals are further encoded with guidance from an entropy model. The decoder, situated at the lower part of the framework, processes bitstreams to initiate the decoding process.

Specifically, referring to FIG. 2, the first stage in the encoding process is to obtain the geometric prior representation, which begins with fitting the high-resolution source point cloud from a predefined template to derive succinct parameters. As the body modeling strategy and the mesh template are available during encoding and decoding, only the parameter set needs to be encoded and conveyed by the corresponding bitstream. Although the general template mesh can be aligned globally based on these parameters and sampled to create a similar-shaped point cloud with the input, differences still exist in the detailed point positions. To address this issue, deep learning modules are adopted to extract high-level embeddings for both the source and aligned point clouds and the warping operations are conducted in the feature domain. This enables the aligned point cloud with enhanced representation capability, leading to more compact residual features with fewer data amounts to be transmitted in the bitstream. In particular, the coordinates of a downsampled input point cloud are losslessly encoded, and their point features are subtracted by the point features generated by the aligned point cloud. These residual features are further compressed using a well-designed entropy model. Some embodiments adopt the same modules with the same weights for mesh-to-point-cloud conversion, feature extraction, and feature warping in the decoding process to maintain consistency on both sides, ensuring faithful reconstruction of the high-quality point cloud.

B. Geometric Prior Representation

Some embodiments utilize the SMPL model [59] as a geometric prior to construct a comparable human point cloud, which can accurately derive a diverse range of body shapes and poses in a compact, flexible, and expressive manner. The mean template used in the embodiments can be manipulated by a collection of parameters, $$\Sigma = \{\alpha, \beta, \theta, \delta, \phi\}, \tag{1}$$

where $\alpha \in \mathbb{R}^{69}$, $\beta \in \mathbb{R}^{10}$, $\theta \in \mathbb{R}^{3}$, $\delta \in \mathbb{R}^{3}$, $\phi \in \mathbb{R}$ represent pose, shape, rotation, translation, and gender, respectively. The shape parameter determines regional variations while the pose parameter controls joint rotations in the body.

The mesh manipulation module combines geometric variation and surface deformation to model the human body, which enables extensively customizable and realistic representations. With the predicted parameters, it is possible to represent vertex deviations from the template as $$V = \overline{T} + B_{shape}(\beta) + B_{pose}(\alpha), \tag{2}$$

where $\overline{T}$ denotes the mean template model. The functions $B_{shape}$ and $B_{pose}$ account for the effects of shape and pose dependent deformations. Based on proximity to the skeleton, surface deformation assigns weights to each vertex of the model, $$T = H(\beta, \theta)V + \delta, \tag{3}$$

where the function H first determines the joint positions influenced by the shape and then expresses the global rotation transformation of these joints.

To regress a human point cloud with a parametric human model, some embodiments utilize the technique introduced by Zuo et al. [54], which involves utilizing a pretrained PointNet++ [61] network in conjunction with a probabilistic correspondence association module. The resulting predicted parameters are quantized and encoded into a bitstream. To ensure the encoder and the decoder to be fully synchronized, an aligned mesh is recovered from the quantized parameters in the mesh manipulation block. This reconstructed mesh is then fed into mesh-to-point-cloud conversion via the Poisson-disk sampling algorithm, generating an aligned point cloud with the similar shape.

C. Feature Residual Extraction and Compression

Using the analogous point cloud predicted from the geometric prior, geometry compression performance of the source point cloud can be promoted by redundancy removal. Specifically, some embodiments extract high-level feature representations of the source and the aligned point clouds separately using stacked downsampling blocks. Since the aligned point cloud refers to a coarse approximation of the target positions, warping operations are carried out within the feature space, following the techniques used in deep video compression for feature-level motion estimation and motion compensation [33]. More precisely, the features of the aligned point cloud are warped onto the coordinates of the source point cloud using sparse convolution. This allows compact residual features to be obtained through feature subtraction, followed by the compression of residual features. It is worth noting that the proposed pipeline is versatile and can be applied in a plug-and-play fashion by swapping out the feature extraction and warping modules with a variety of approaches. In one implementation, the feature extraction and warping techniques are inherited from the aforementioned deep point cloud compression approaches [10], [42], [49] based on sparse convolution [62] to retain essential and critical point characteristics.

In sparse convolution techniques, intermediate outcomes between modules are represented by sparse tensors. Specifically, a sparse tensor $\mathcal{X}$ saves only non-zero elements using a coordinate-feature pair $\mathcal{X} \Leftrightarrow (C, F)$. Each non-zero coordinate $(x_i, y_i, z_i) \in C$ corresponds to the associated feature $f_i \in F$, enabling accurate representation with abundant contexts. By applying convolutional filters only to non-zero elements, sparse convolution significantly reduces computational complexity and memory usage. Sparse convolution [62], [63] specified in the 3D space is referred to as $$f_u^{out} = \sum_{i \in \mathcal{N}^3(u, C^{in})} W_i f_{u+i}^{in} \text{ for } u \in C^{out}, \quad (4)$$

where input and output coordinates $C^{in}$ and $C^{out}$ correspond to input and output feature vectors $F^{in}$ and $F^{out}$, respectively. The set $\mathcal{N}^3$ denotes a 3D kernel with an arbitrary shape, and its subset $\mathcal{N}^3(u, C^{in}) = \{i | u+i \in C^{in}, i \in \mathcal{N}^3\}$ contains the offsets from the current 3D coordinate u that exist in $C^{in}$. The kernel weight is denoted by W. In one implementation, the kernel is defined as a hypercube with a size of 3, namely $[-1,0,1]^3$, and the Minkowski [63], [64] is adopted as the sparse inference engine.

Figure 3:
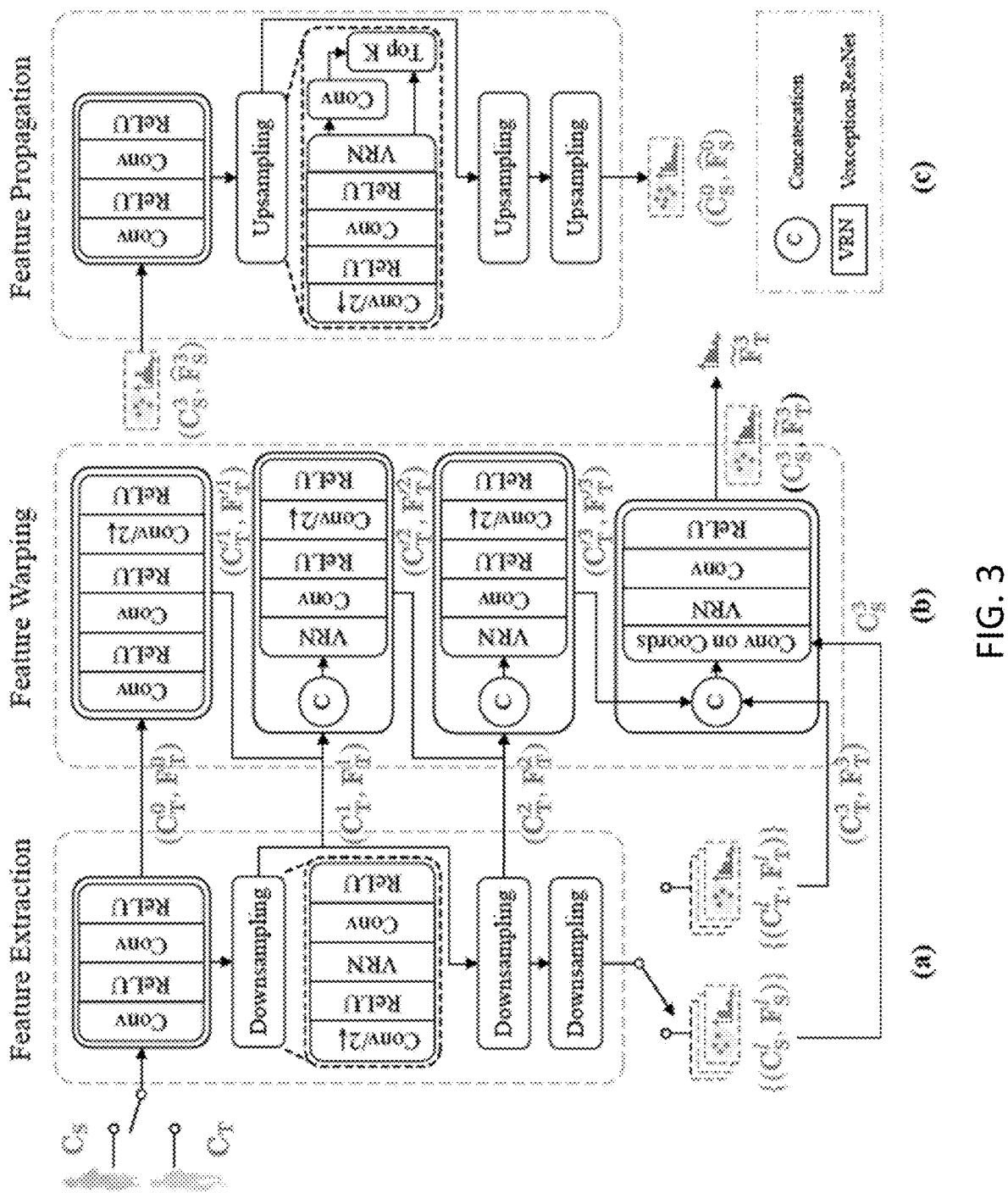
FIG. 3 shows an example network structure of (a) feature extraction, (b) feature warping, and (c) feature propagation modules according to an embodiment of the invention.

FIG. 3 shows an example network structure of (a) feature extraction, (b) feature warping, and (c) feature propagation modules. The input of the feature extraction module can be coordinates of the source point cloud $C_S$ or the aligned point cloud $C_T$. "Conv/2↓" and "Conv/2↑" represent the convolution and transposed convolution operations with the stride of 2. "Conv on Coords" convolves on target coordinates using a generalized transposed sparse convolution layer. An example with three scales, L=3, is considered.

1) Feature Extraction:

Using sparse convolution as the essential operation, the feature extraction module is carefully designed to enable high-level embedding prediction. Following learning-based compression methods [10], [11], the proposed approach works in a bottom-up manner by progressively reducing the spatial resolution and exponentially increasing the receptive field. As shown in FIG. 3(a), each downsampling block in the feature extractor comprises a strided convolution, a VRN unit [42], [43], and another convolution layer in a cascading manner. Specifically, the strided convolution reduces the number of points, while the subsequent convolution layer refines extracted features for optimal performance. The VRN [43] unit, located between the two convolution layers, utilizes skip connections to mitigate information loss during training and employs parallel convolutional layers with varying kernel sizes, namely 1×1×1 or 3×3×3, to capture features at different ranges. By stacking these downsampling blocks, the feature extraction module outputs multiscale sparse tensors, including coordinates and features, that form the latent representation of an entire point cloud. As such, the extracted features can reconstruct the original geometry information in a hierarchical manner with only a small number of output coordinates as indispensable information to decrease required bits. Some embodiments of the invention losslessly encode these coordinates using a coordinate encoder [5], and further process multiscale features in the following modules.

2) Feature Warping:

The feature warping module is designed to transform the extracted features from the aligned point cloud to the coordinates of the source point cloud. This process is completed in a coarse-to-fine manner, with each scale entailing a hierarchical concatenation of primary sparse tensors $\mathcal{X}$ from the feature extractor and auxiliary sparse tensors $\mathcal{X}'$ from the previous block, as illustrated in FIG. 3(b). To this end, the preceding block utilizes a strided convolution layer similar to the feature extraction module. By performing this concatenation, some embodiments of the invention can enrich some informative points upon the downscaled output of the feature extraction module for subsequent blocks.

In the final block of the module, the concatenated features of the aligned point cloud are convolved on downscaled coordinates of the source point cloud using a generalized sparse transposed convolution layer [49], [62]. The process can be represented succinctly as $$\left(C_S^L, \tilde{F}_T^L\right) = G(\mathcal{X}_T^L \oplus \mathcal{X}_T'^L, C_S^L), \quad (5)$$

where $\oplus$ denotes the concatenation operation of the downscaled primary $\mathcal{X}_T^L$ and auxiliary sparse tensors $\mathcal{X}_T'^L$, and the function G represents the operations predominantly performed by the layer that convolves on target coordinates, which is illustrated in FIG. 4(a). As shown in FIG. 4(a), each 3D point is represented by a 2D grid where the grid position indicates the point's 3D coordinate and the grid pattern represents its feature. As can be observed, during the operation of convolution on coordinates, the output point D retains the same coordinate as the target point C, while its feature is determined by input points A and B within the receptive field. After the operation of convolution on coordinates, the output sparse tensor comprises coordinates of the source point cloud $C_S^L$ and warped features of the aligned point cloud $\tilde{F}_T^L$ from the last scale L. This allows the proposed approach to fix the output coordinates and capture essential information from the input.

3) Residual Feature Calculation:

After obtaining warped features of the aligned point cloud, it is straightforward to perform feature-level subtraction. Recent works on dynamic PCC [49], [50] have performed inter prediction in the feature space. Following this vein, the framework in some embodiments of the invention aims to factor out redundancy between a source point cloud and its variant in the feature domain. Specifically, the warped features of the aligned point cloud $\tilde{F}_T^L$ are subtracted from the features of the source point cloud $F_S^L$, resulting in residual features. This process can be formulated as $$\Delta F^L = F_S^L - \tilde{F}_T^L, \quad (6)$$

where $\Delta F^L$ denotes feature residuals in the last scale L. Feature-level alignment avoids the challenge of directly computing offsets in Euclidean space, which can be difficult due to the inherent complexity of accurately matching unordered points. Analogously, this attempt has also been proven to be effective in deep video compression [33]. It shrinks prediction errors caused by optical flow-based motion compensation in the pixel domain by computing feature-level residuals between extracted features and motion-warped features.

4) Residual Feature Compression:

To compress residual features, a uniform quantizer is added to the latent code, thereby implementing vector quantization on original signal space. Subsequently, the entropy of the residual features is estimated and arithmetic encoding is applied for further compression. Specifically, the incorporation of additive uniform noise for features during the training phase allows for the approximation of the rounding operation and ensures differentiability within the optimization process. During the inference phase, rounding is directly applied. After quantization, the entropy of the latent representation is estimated using an entropy bottleneck based a non-parametric factorized model [7] that constructs an independent probability density model for each channel. The selected entropy model can be further extended to advanced approaches with a hyperprior [8] or joint autoregressive hierarchical priors [65].

D. Decoding

The total bitstream in some embodiments comprises three components, including parameters, coordinates, and residual features. The parameters are utilized to generate a variant point cloud, from which features are extracted and residual features are added to reconstruct the original geometry of the input. Specifically, the parameters are first decoded to manipulate the template mesh, which is accessible in both the encoding and decoding processes as shown in FIG. 2. Subsequently, a reconstructed aligned mesh serves as the input for the mesh-to-point-cloud conversion, producing an aligned point cloud. This is followed by a feature extraction module that captures multiscale high-level embeddings. These predicted features of the aligned point cloud are warped onto a decoded set of coordinates corresponding to skeleton points of a source point cloud. Meanwhile, residual features are decoded from the bitstream and added to the previously obtained warped features, resulting in the recovered features of the source point cloud. These features are subsequently propagated to upscale the points close to the source point cloud.

The feature propagation module mainly employs a transposed convolution layer with a two-stride in each upsampling block, as depicted in FIG. 3(c), to upscale the input coordinate set while retaining its sparsity pattern. The outcome of transposed convolution is demonstrated in the intermediate layer shown in FIG. 4(b), where the lighter grids represent dilated points absent in the input and the darker grids correspond to inherent coordinates of the input. The transposed convolution layer may generate overlapping regions, as portrayed by point C belonging to both the generated regions of points A and B. To remove dispensable points and sustain information fidelity, an additional convolution layer and a pruning layer are attached after the VRN [43] in each upsampling block. The convolution layer determines the probability of a point being occupied, while the pruning layer eliminates points with low occupancy probability and preserves only the top K points. Here, K corresponds to the number of points in the input. Furthermore, hierarchical skip connections are introduced during training to allow upsampled points to retrieve fine-grained details of the source point cloud with the aid of multiscale features from the feature extractor.

E. Loss Function

The objective of point cloud geometry compression is to minimize the number of required bits while maintaining maximum reconstruction quality of geometry. To this end, the RD tradeoff loss function is optimized, $$\mathcal{L} = \lambda R + D, \quad (7)$$

where the Lagrange multiplier $\lambda$ balances rate R and distortion D. Only the rate of feature residuals is represented by R, as the compression of both manipulation parameters and downscaled coordinates is excluded from the optimization process. To bypass the difficulty of matching unordered points, probability-based methods are employed to calculate coordinate errors. The distortion is determined by the sum of the binary cross entropy (BCE) [64] in each scale, $$D = \sum_{l=1}^{L} BCE^l(X_S^l, \hat{X}_S^l) \quad (8)$$
$$= \sum_{l=1}^{L} \frac{1}{N^l} \sum_{i=1}^{N^l} -b_i \log(p_i) - (1-b_i)\log(1-p_i),$$

where $X_S^l$ and $\hat{X}_S^l$ denotes the source and decoded sparse tensors in scale l=1, ..., L with L=3 in one implementation, and $N^1$ represents the number of decoded points in scale 1. A binary occupancy value $b_i$ indicates the inclusion or exclusion of a decoded point i as part of the source, and $p_i$ denotes the probability of that point being occupied.

Experiments are performed to evaluate the framework/method in one embodiment of the invention. Details related to the experiments are presented below.

A. Implementation Details

Figure 5:
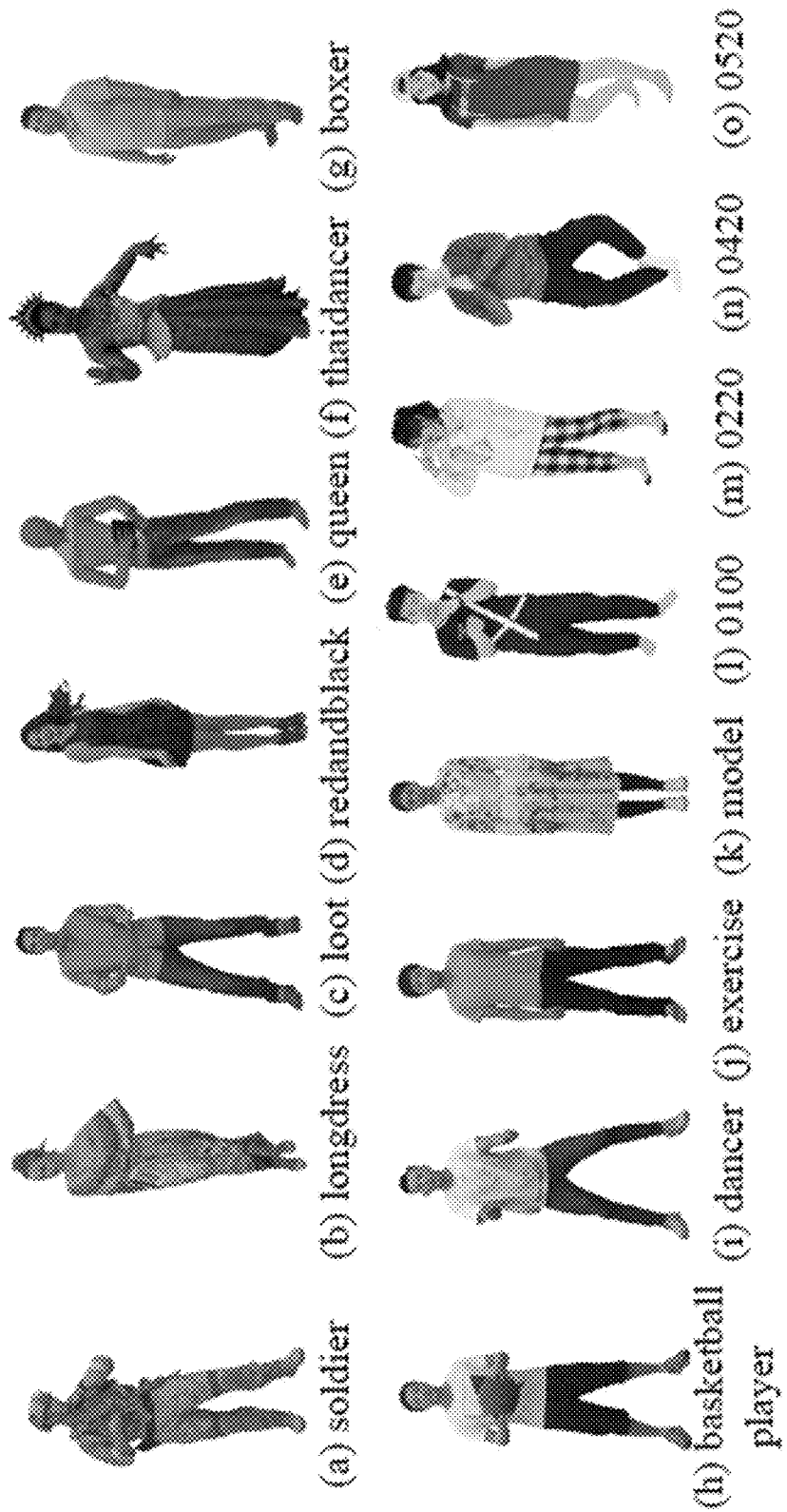
FIG. 5 shows example training and testing datasets according to an embodiment of the invention.
Figure 6A:
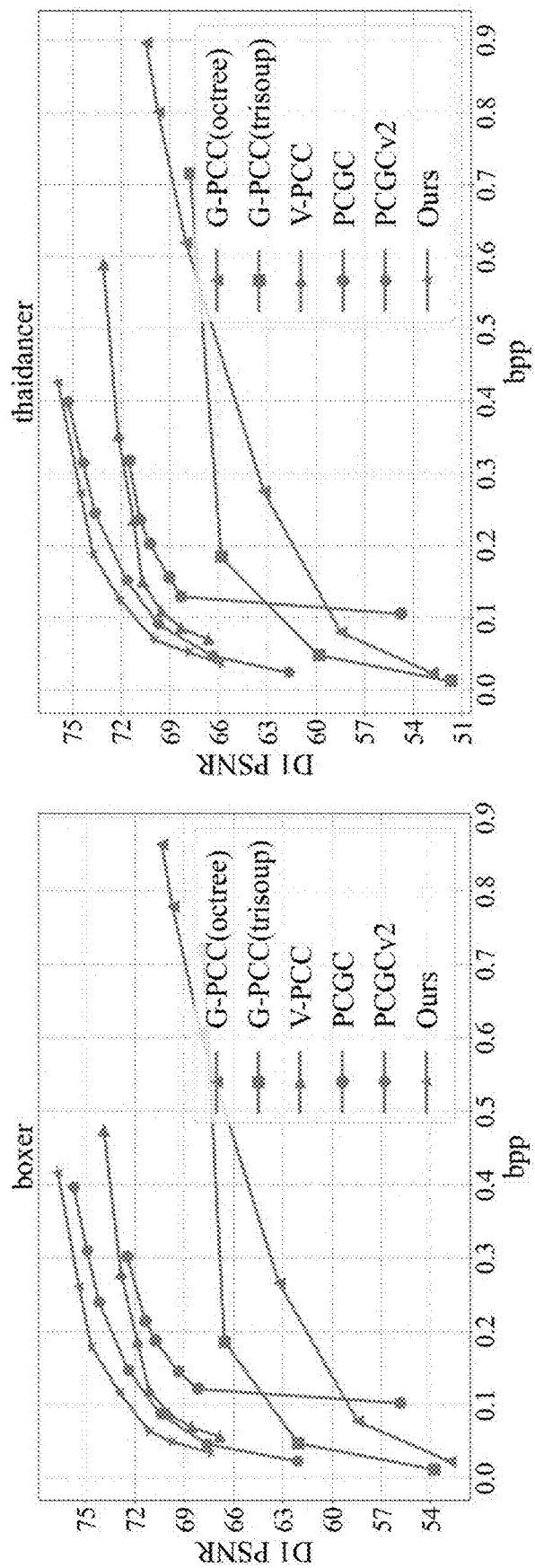
FIG. 6A to 6E show example RD performance of the proposed approach and baselines on Owlii [66], 8iVSLF [68], and THuman2.0 [67] datasets using D1 error [69], [70](FIG. 6A: sequences "boxer" and "thaidancer"
Figure 6B:
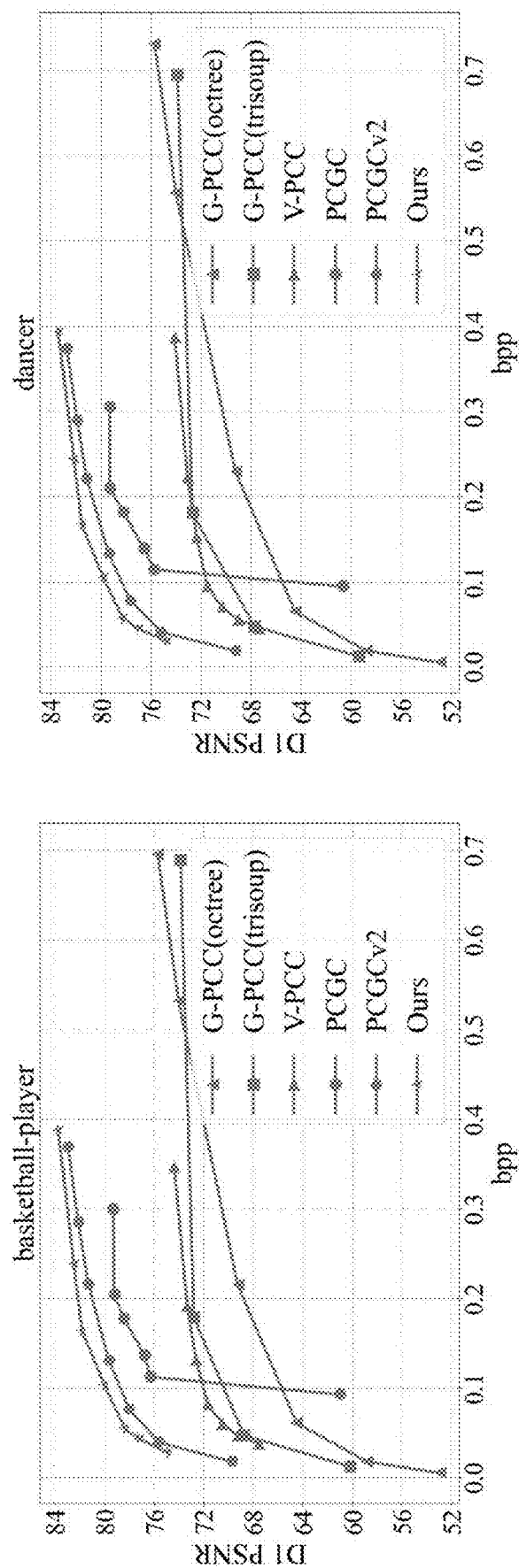
Figure 6C:
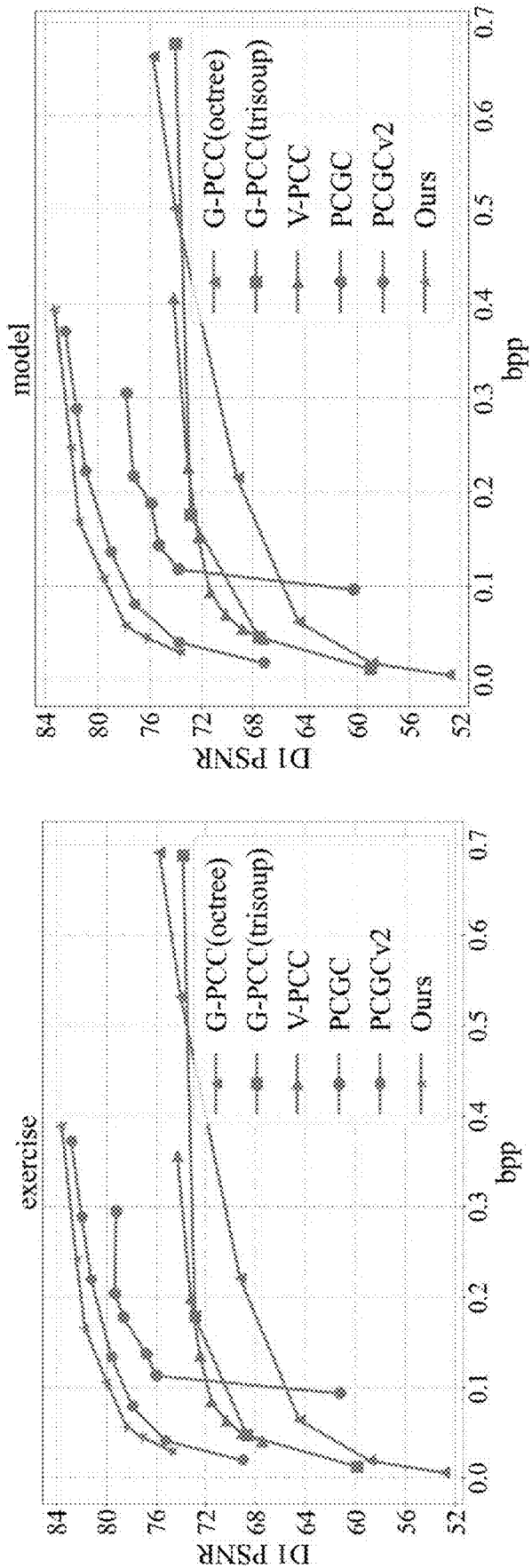
Figure 6D:
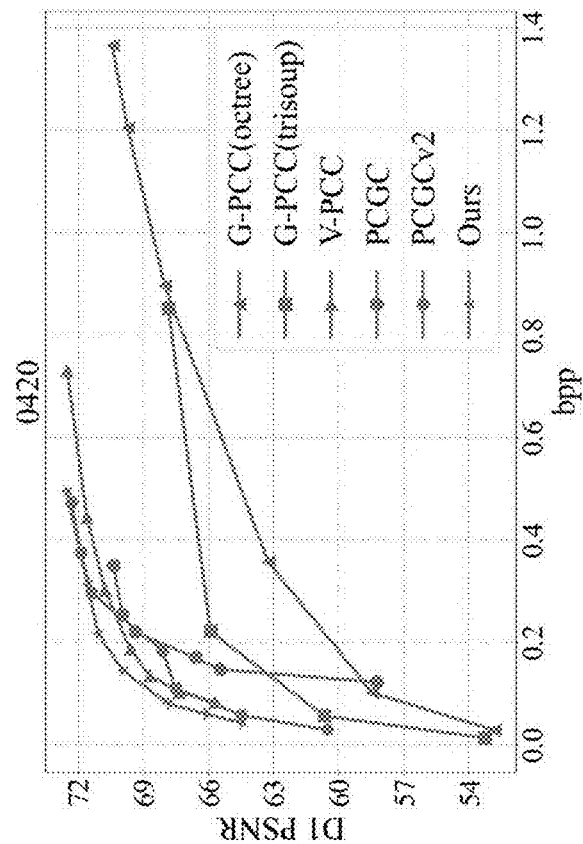
Figure 6D:
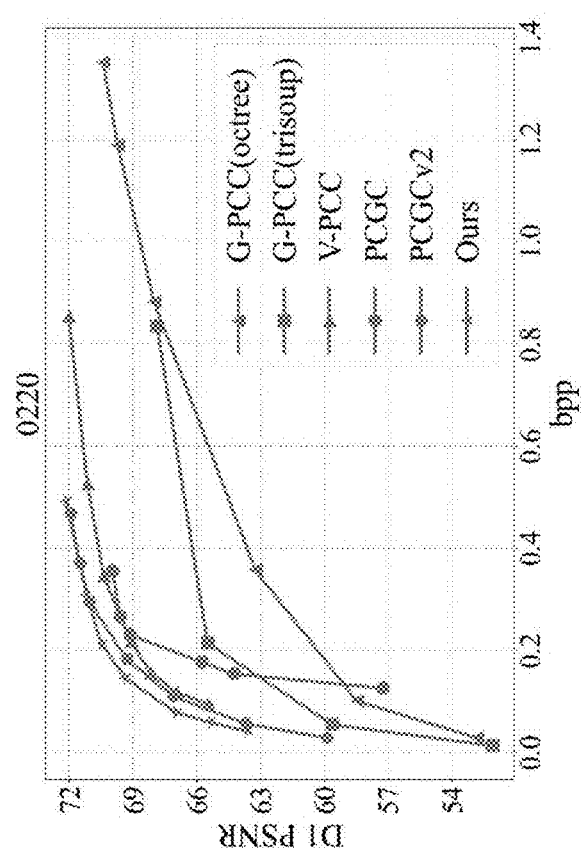
Figure 6E:
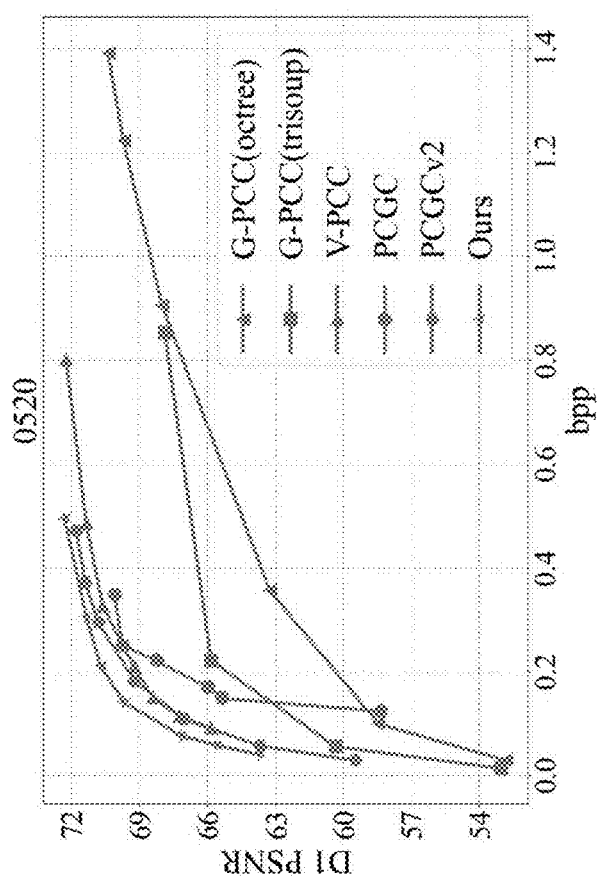

1) Datasets:

A series of experiments are conducted on prevailing high-resolution human point cloud datasets, namely 8i Voxelized Full Bodies (8iVFBv2) [1], Owlii dynamic human dataset (Owlii) [66], THuman2.0 [67], and 8i Voxelized Surface Light Field (8iVSLF) [68], as shown in FIG. 5 and summarized in Table I. In FIG. 5, multiple frames of sequences from (a) soldier to (e) queen are utilized for training. A single frame of sequences from (f) thaidancer to (o) 0520 is employed for testing. The 8iVFBv2 dataset [1] and the sequence queen from MPEG PCC [69], [70] are used for training. The former contains four sequences with 300 frames each, while the latter includes 250 frames. Due to GPU memory limitations, each point cloud is partitioned into four patches using a KD-tree, thus resulting in a total of 5800 3D patches for training. During testing, the entire human point clouds are employed for inference, using point clouds from standardization committees: basketball player, dancer, exercise, model sequences from Owlii [66], thaidancder and boxer from 8iVSLF [68]. To further demonstrate the generalization capability, some embodiments of the invention also utilize high-quality human scans from the publicly available and challenging THuman2.0 dataset [67], which are processed into point clouds with the midpoint subdivision algorithm and employed as testing data. Furthermore, the geometry precision for point clouds, as indicated in the last column of Table I, represents the number of distinct values along each axis of the 3D coordinates. For instance, with a geometry precision of 10 bits, the x, y, and z values for each point range from 0 to 1023.

TABLE I

DETAILS OF POINT CLOUDS USED IN TRAINING AND TESTING IN THE EXPERIMENTS

| Dataset | Point cloud | # points | # frames | Precision |
|---|---|---|---|---|
| 8iVFBv2 [1] | soldier | 1,059,810 | 300 | 10 |
|  | longdress | 765,821 | 300 | 10 |
|  | loot | 784,142 | 300 | 10 |
|  | redandblack | 729,133 | 300 | 10 |
| 8iVSLF [68] | queen | 1,006,509 | 250 | 10 |
|  | thaidancer | 979,857 | 1 | 10 |
|  | box | 994,546 | 1 | 10 |
| Owlii [66] | basketball player | 2,880,057 | 1 | 11 |
|  | dancer | 2,592,758 | 1 | 11 |
|  | exercise | 2,391,718 | 1 | 11 |
|  | model | 2,458,429 | 1 | 11 |
| THuman2.0 [67] | 0100 | 2,391,718 | 1 | 10 |
|  | 0200 | 847,940 | 1 | 10 |
|  | 0420 | 766,152 | 1 | 10 |
|  | 0520 | 770,210 | 1 | 10 |

2) Performance Evaluation:

The quantitative evaluation assesses the performance of the proposed approach (embodiment of the invention) based on the RD criteria by computing Bjøntegaard delta rate (BD-Rate) and Bjøntegaard delta peak signal-to-noise ratio (BD-PSNR) results. The bitrate is calculated by total bitstreams of prior parameters, downscaled coordinates, and feature residuals, and the measurement is reported as bits per point (bpp). The geometric distortion is calculated by point-to-point (D1) and point-to-plane (D2) errors [69], [70]. D1 computes the distance by connecting each point in a distorted point cloud and its closest points in the reference point cloud, and D2 derives a new distance vector by projecting the original distance vector along the normal direction. Following the MPEG common test conditions (CTC) [69], [70], some embodiments of the invention calculate the peak signal-to-noise ratio (PSNR) value over the symmetric D1 and D2. More specifically, some embodiments of the invention first apply the source point cloud as a reference to evaluate the decoded point cloud then swap them and compute the maximum PSNR value between these two paradigms to obtain the symmetric distortion.

3) Training Procedure:

The training procedure focuses on the coding of residual features produced by subtracting features of the source and aligned point clouds. Seven models are trained using different factors $\lambda$ in equation (7), specifically $\lambda \in \{0.2, 0.5, 1.1, 2.5, 6, 9, 13\}$. Some method embodiments are accomplished on a machine with a NVIDIA GeForce RTX 3090 GPU in memory of 24 GB, and three scales are implemented in the hierarchical structure. The batch size is set as 8 and the model is trained for 64 epochs. The Adam optimizer is employed with weight decaying and the initial value is set to 0.0001. It is worth mentioning that the compression of predicted geometric prior parameters and downsampled coordinates is not included in the training procedure. Predicted parameters are obtained by using the pre-trained model from [54] in the mesh regression module, and these parameters are rounded to three decimal places. For downsampled coordinates, they are encoded losslessly using G-PCC [4].

B. Performance Comparisons

Herein, the point cloud geometry coding performance is reported and the proposed framework according to an embodiment is compared to other approaches to showcase the superiority of the embodiment.

1) Baselines:

To validate the effectiveness of the proposed framework, a comparative study of various point cloud geometry compression techniques is conducted, including traditional and learning-based approaches. G-PCC [4] and V-PCC [5] are representative techniques for conventional codecs, and PCGC [42] and PCGCv2 [10] are learning based baselines. Specifically, G-PCC and V-PCC are examined using the latest version available, i.e., TMC13v14 for G-PCC and TMC2v18 in All-Intra mode for V-PCC. Two branches of G-PCC for geometry compression, namely, the octree-based and surface reconstruction based (trisoup) schemes are compared. The quantization parameter settings for G-PCC (octree), GPCC (trisoup), and V-PCC follow CTC [69], [70], with the bitstream compositions for attribute disregarded. For learning-based baselines, PCGC employs point cloud voxelization and stacked 3D convolutions to capture compact features, while PCGCv2 leverages sparse convolution layers in a multiscale manner. It is worth mentioning that the proposed framework is versatile and is compatible with a play-and-plug setup, and the feature extraction component shown in the proposed framework utilizes the same network structure as PCGCv2. For fair comparisons, a factorized prior model [7] is employed as the entropy model in learning-based baselines and the proposed approach.

2) Experimental Results:

Tables IIA and IIB report the BD-Rate and BD-PSNR (Peak Signal-to-Noise Ratio) results of the proposed framework against G-PCC (octree), G-PCC (trisoup), V-PCC, PCGC, and PCGCv2 with D1 and D2 errors as distortion and bpp as bitrate. It is observed that the proposed achieves significant bitrate savings and BD-PSNR gains compared to these traditional and learning-based methods on human point clouds from various datasets. Specifically, the proposed method outperforms G-PCC (octree) with an average of 92.34% and 89.45% bitrate savings in terms of D1 and D2, respectively. Significant improvement has also been noticed against G-PCC (trisoup) and V-PCC with more than 87% and 59% BD-Rate gains individually regarding both distortion errors. When compared with learning-based methods such as PCGC and PCGCv2, the proposed method embodiment achieves 64.98% and 28.70% bitrate savings in terms of D1, respectively. In particular, the proposed approach has around 1.26 dB gains over PCGCv2 on the 8iVSLF dataset, 1.31 dB on Owlii, and 1.17 dB on THuman2.0. As PCGCv2 shares the same feature extraction network structure as the proposed approach, the performance improvement is a clear indication of the effectiveness of incorporating geometric priors and residual features. The proposed approach also outperforms learning-based baselines with respect to D2 errors.

As shown in FIG. 6A to FIG. 6E, the proposed framework yields superior RD performance compared with other traditional and learning-based methods on diverse human point clouds in terms of D1 PSNR. It is not surprising to observe that the proposed method embodiment achieves more gains at 0.15 bpp than 0.05 bpp when compared with PCGCv2. This can be attributed to the fact that the coordinates of downsampled points must be encoded losslessly and residual features take up a larger proportion of the bitstream at higher bitrates, resulting in greater gains. Furthermore, the proposed approach and PCGCv2 outperform traditional codecs, while PCGC only falls behind V-PCC. This demonstrates promising capability of learning-based approaches for point cloud geometry compression.

TABLE IIA

BD-RATE RESULTS AGAINST THE BASELINES G-PCC (OCTREE) [4], G-PCC (TRISOUP) [4], V-PCC [5], PCGC [42], PCGCV2 [10] ON DATASETS OWLII [66], 8IVSLF [68], AND THUMAN 2.0 [67] USING D1 AND D2 ERRORS [69], [70] IN THE EXPERIMENT

| Dataset | Sequence | BD-Rate with D1 PSNR (%) | | | | |
|---|---|---|---|---|---|---|
| | | G-PCC (octree) | G-PCC (trisoup) | V-PCC | PCGC | PCGCv2 |
| 8iVSLF | boxer | −93.92 | −93.62 | −50.02 | −67.96 | −32.60 |
| | thaidancder | −91.85 | −87.86 | −48.48 | −61.25 | −22.42 |
| Owlii | basketball player | −95.42 | −98.36 | −93.54 | −69.61 | −29.31 |
| | dancer | −95.20 | −97.75 | −94.03 | −68.98 | −30.30 |
| | exercise | −95.07 | −98.22 | −93.12 | −68.19 | −30.84 |
| | model | −93.94 | −94.10 | −91.24 | −75.77 | −32.73 |
| THuman2.0 | 0100 | −89.54 | −75.01 | −19.08 | −64.87 | −26.80 |
| | 0220 | −88.64 | −75.72 | −37.71 | −57.37 | −20.60 |
| | 0420 | −90.20 | −77.84 | −30.34 | −56.38 | −33.06 |
| | 0520 | −89.60 | −74.59 | −36.18 | −59.39 | −28.35 |
| | Average with D1 | −92.34 | −87.31 | −59.37 | −64.98 | −28.70 |

| Dataset | Sequence | BD-Rate with D2 PSNR (%) | | | | |
|---|---|---|---|---|---|---|
| | | G-PCC (octree) | G-PCC (trisoup) | V-PCC | PCGC | PCGCv2 |
| 8iVSLF | boxer | −90.90 | −92.23 | −49.28 | −64.72 | −30.16 |
| | thaidancder | −88.36 | −88.38 | −51.75 | −61.64 | −22.50 |
| Owlii | basketball player | −92.38 | −96.73 | −86.81 | −70.48 | −25.70 |
| | dancer | −92.18 | −95.61 | −87.66 | −70.25 | −26.06 |
| | exercise | −91.88 | −96.02 | −86.48 | −68.13 | −26.79 |
| | model | −89.79 | −90.97 | −85.89 | −68.29 | −27.97 |
| THuman2.0 | 0100 | −86.58 | −80.36 | −37.43 | −72.03 | −21.94 |
| | 0220 | −86.56 | −83.43 | −56.99 | −58.65 | −13.93 |
| | 0420 | −87.73 | −82.52 | −45.90 | −66.95 | −15.72 |
| | 0520 | −88.16 | −84.53 | −55.13 | −71.29 | −15.21 |
| | Average with D2 | −89.45 | −89.08 | −64.33 | −67.24 | −22.60 |

TABLE IIB

BD-PSNR RESULTS AGAINST THE BASELINES G-PCC (OCTREE) [4], G-PCC (TRISOUP) [4], V-PCC [5], PCGC [42], PCGCV2 [10] ON DATASETS OWLII [66], 8IVSLF [68], AND THUMAN 2.0 [67] USING D1 AND D2 ERRORS [69], [70] IN THE EXPERIMENT

| Dataset | Sequence | BD-PSNR with D1 (dB) | | | | |
|---|---|---|---|---|---|---|
| | | G-PCC (octree) | G-PCC (trisoup) | V-PCC | PCGC | PCGCv2 |
| 8iVSLF | boxer | 12.77 | 7.89 | 2.65 | 5.16 | 1.48 |
| | thaidancder | 11.56 | 7.81 | 2.65 | 4.83 | 1.04 |
| Owlii | basketball player | 13.60 | 9.03 | 8.47 | 5.08 | 1.19 |
| | dancer | 13.51 | 9.19 | 8.82 | 4.95 | 1.23 |
| | exercise | 13.55 | 8.81 | 8.54 | 4.89 | 1.29 |
| | model | 12.86 | 8.70 | 8.62 | 6.58 | 1.54 |
| THuman2.0 | 0100 | 9.13 | 5.02 | 0.55 | 4.03 | 1.10 |
| | 0220 | 9.04 | 5.15 | 1.38 | 3.47 | 0.91 |
| | 0420 | 9.62 | 5.22 | 1.04 | 3.17 | 1.37 |
| | 0520 | 9.29 | 5.06 | 1.29 | 3.40 | 1.29 |
| | Average with D1 | 11.49 | 7.19 | 4.40 | 4.56 | 1.25 |

| Dataset | Sequence | BD-PSNR with D2 (dB) | | | | |
|---|---|---|---|---|---|---|
| | | G-PCC (octree) | G-PCC (trisoup) | V-PCC | PCGC | PCGCv2 |
| 8iVSLF | boxer | 12.08 | 8.99 | 3.01 | 5.00 | 1.59 |
| | thaidancder | 10.87 | 8.43 | 3.20 | 4.76 | 1.17 |
| Owlii | basketball player | 12.46 | 9.18 | 8.64 | 5.79 | 1.27 |
| | dancer | 12.35 | 9.23 | 8.96 | 5.37 | 1.27 |
| | exercise | 12.36 | 9.30 | 8.71 | 5.42 | 1.35 |
| | model | 11.27 | 9.02 | 8.85 | 6.11 | 1.50 |

TABLE IIB-continued

BD-PSNR RESULTS AGAINST THE BASELINES G-PCC (OCTREE)
[4], G-PCC (TRISOUP) [4], V-PCC [5], PCGC
[42], PCGCV2 [10] ON DATASETS OWLII [66],
8IVSLF [68], AND THUMAN 2.0 [67] USING D1 AND
D2 ERRORS [69], [70] IN THE EXPERIMENT

| | | | | | | |
|---|---|---|---|---|---|---|
| THuman2.0 | 0100 | 9.32 | 6.38 | 1.60 | 2.65 | 0.98 |
| | 0220 | 9.47 | 7.16 | 3.23 | 3.24 | 0.64 |
| | 0420 | 9.96 | 7.08 | 2.27 | 2.60 | 0.74 |
| | 0520 | 9.85 | 7.21 | 2.89 | 2.56 | 0.68 |
| Average with D2 | | 11.00 | 8.20 | 5.13 | 4.35 | 1.12 |

C. Ablation Studies

To further validate the effectiveness of the proposed scheme, the bitstream composition, residual features, visualization results, RD performance on point cloud with different geometry precision, and runtime comparisons are provided.

Figure 7:
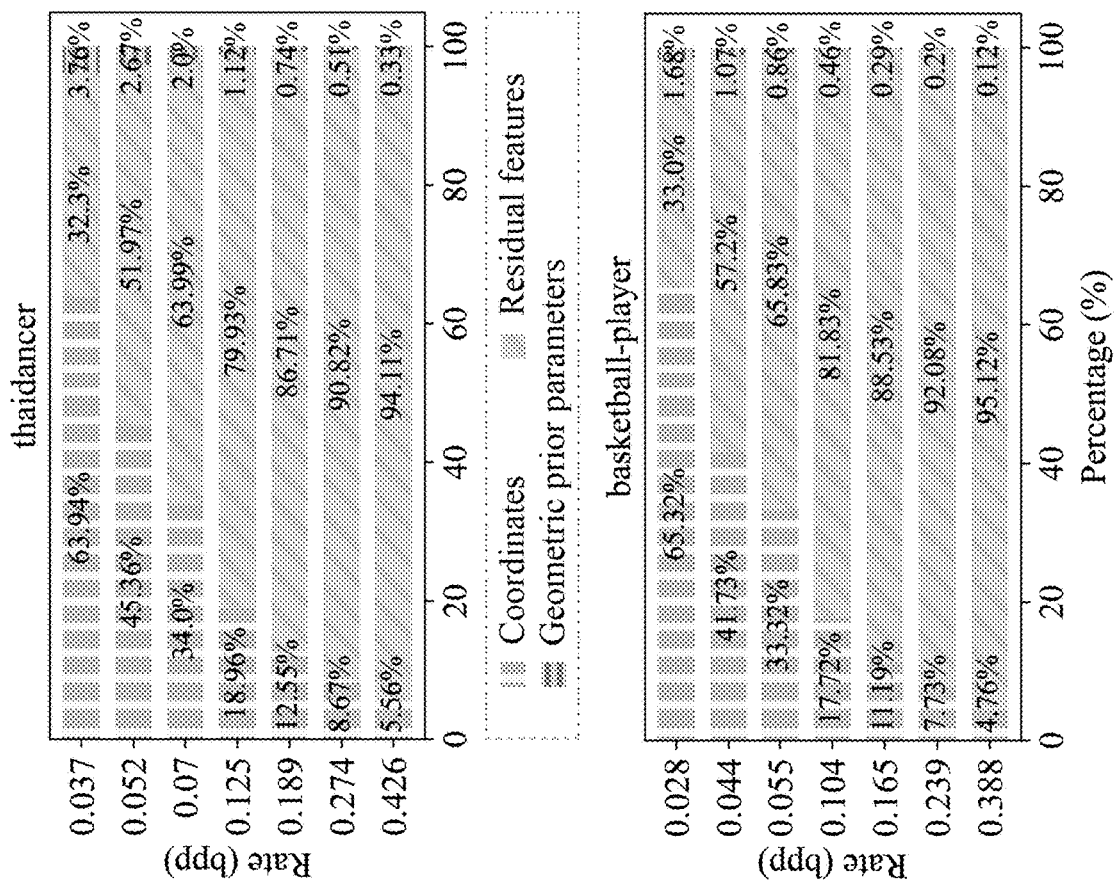
FIG. 7 shows an example bitstream composition at different bitrate levels according to an embodiment of the invention.

1) Bitstream Composition:

To investigate the cost of geometric priors introduced in the proposed approach, the bitstream composition is presented at different bitrate levels, as illustrated in FIG. 7. For each bitrate level, the percentage of bits in terms of downsampled coordinates, residual features, and geometric prior parameters is reported. In particular, it can be seen that geometric parameters account for a small portion of the total bits, with less than 3.8% in the sequence thaidancer and at most 1.7% in the sequence basketball-player. More importantly, it is observed that the proportion of bits allocated to geometric prior parameters decreases as the bitrate increases. This is because the quantized 86 parameters require approximately 1,368 bits, and residual features become the primary consumer of bits. For higher bitrates, bits of geometric prior parameters can take up less than 0.5%, while residual features occupy more than 90%. This demonstrates that the proposed method has the potential to reduce the number of bits required for features with negligible cost by utilizing geometric prior parameters.

Figure 8:
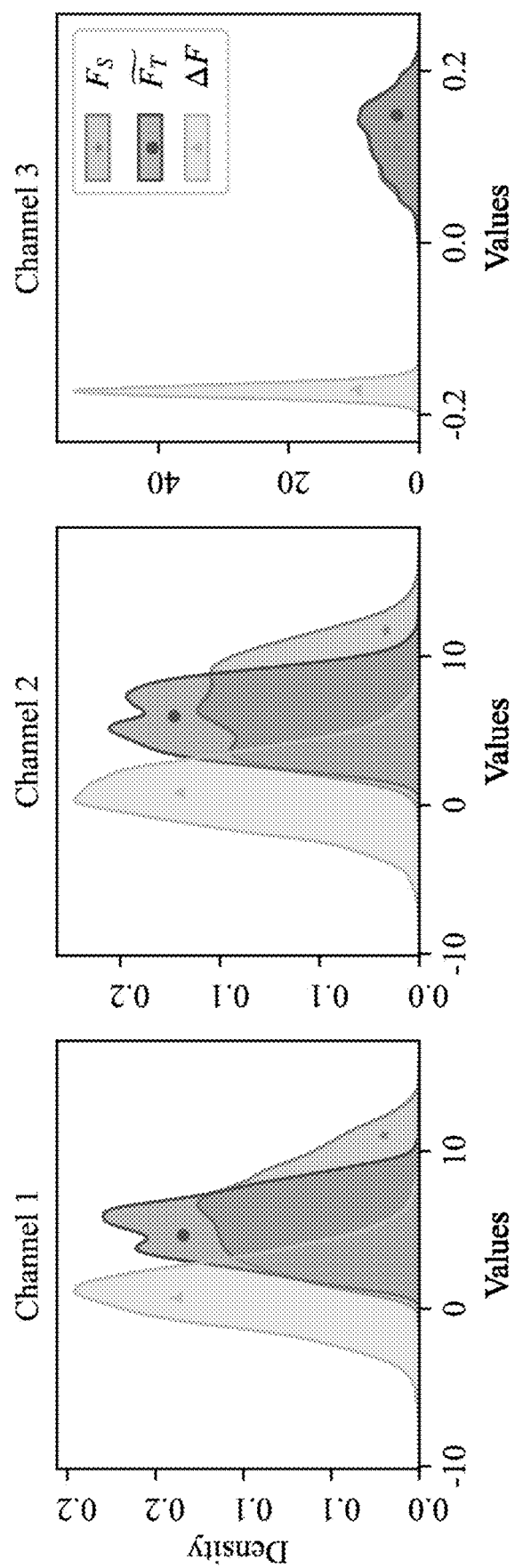
FIG. 8 shows example distributions of features of the source point cloud $F_S$, warped features of the aligned point cloud $\hat{F}_T$, and residual features $\Delta F$ in different channels according to an embodiment of the invention.
Figure 9:
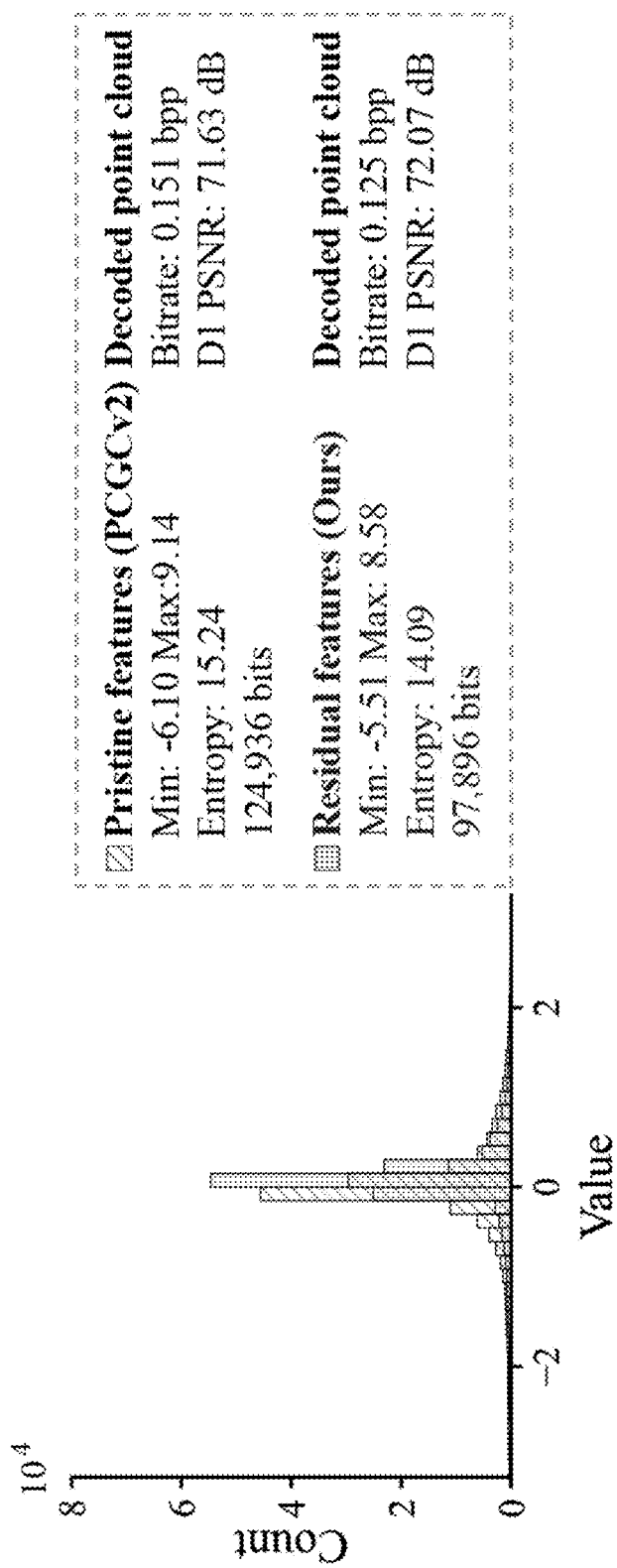
FIG. 9 shows an example histogram, value range, entropy, and corresponding decoded point cloud information of pristine features and residual features according to an embodiment of the invention.

2) Analysis of Residual Features:

FIG. 8 showcases the distribution of two features before and after residual feature computation, as described in equation (6). The residual feature $\Delta F$ in the proposed framework, represented by the triangle area in FIG. 8, has a more concentrated distribution in different channels compared to the feature of the source point cloud $F_S$ and the warped feature of the aligned point cloud $\hat{F}_T$. As the residual features are further encoded by the entropy bottleneck, two cases are compared: compressing pristine features with PCGCv2 and compressing residual features with the proposed approach. From the histogram in FIG. 9, it is apparent that the residual feature has more values near zero and a limited value range. As a result, the entropy of the residual feature is smaller at 14.09 compared to 15.24 for the pristine feature. Furthermore, although the residual feature requires fewer bits at 97,896 compared to 124,936 for the pristine feature, the reconstructed point cloud has better quality with 0.44 dB gain in terms of D1 PSNR. This demonstrates that residual features require fewer bits while maintaining better information fidelity compared to directly compressing pristine features.

Figure 10:
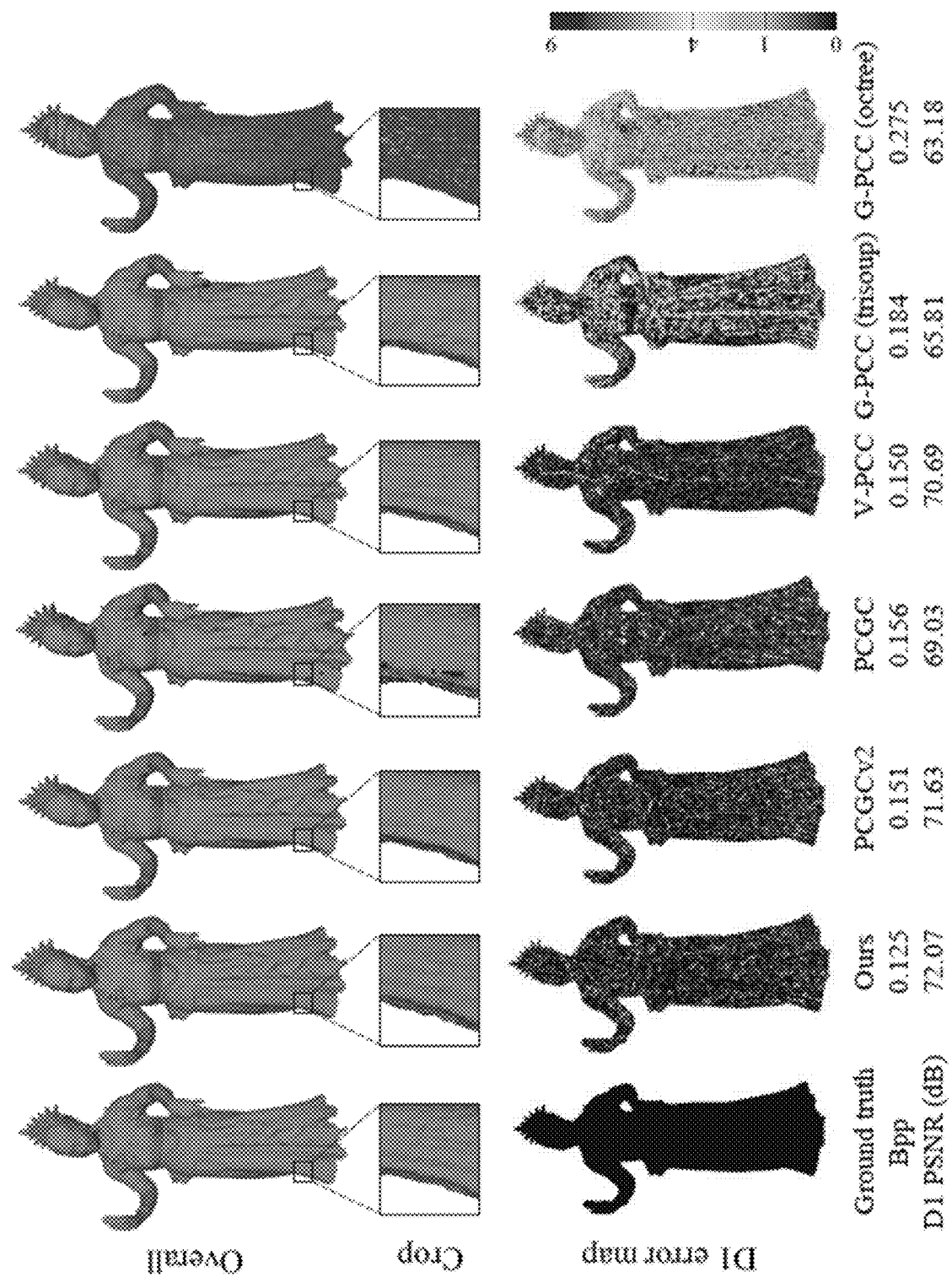
FIG. 10 shows example visualization of geometry reconstruction results of the sequence thaidancer from the proposed method embodiment, PCGCv2, PCGC, V-PCC, G-PCC (trisoup), and G-PCC (octree).
Figure 11:
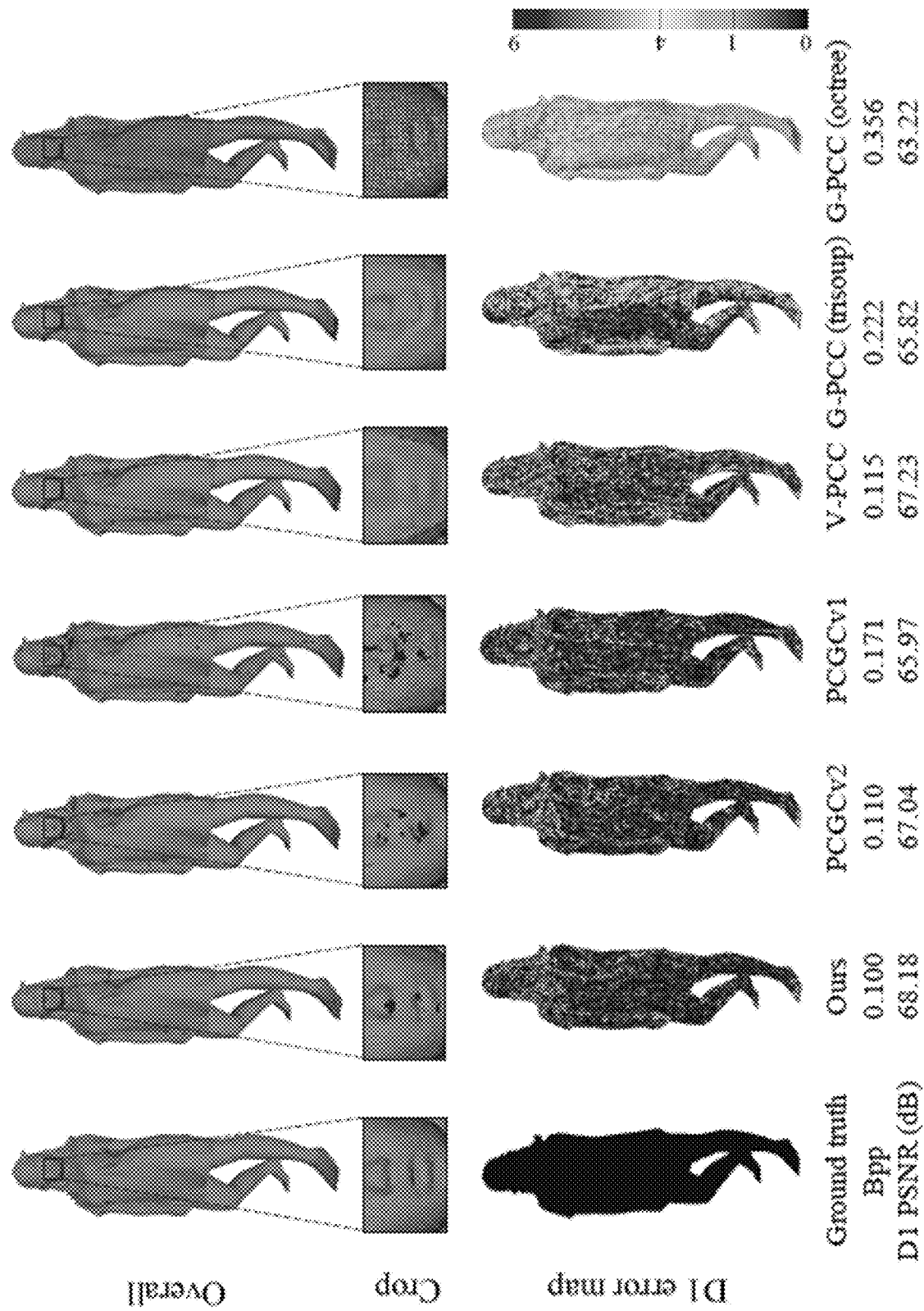
FIG. 11 shows example visualization of geometry reconstruction results of the sequence 0520.

3) Qualitative Evaluations:

The reconstructed point clouds from different point cloud geometry compression methods are visualized. FIG. 10 and FIG. 11 display the overall geometry of the whole point cloud, a zoomed-in region with geometry details, and an error map in terms of D1 distance for the sequences thaidancer and 0520, respectively. Compared to other baselines, the proposed approach can generate high-quality decoded point cloud geometry with lower bitrates. In FIG. 10, areas within the rectangles in the first row are zoomed-in in the second row. The final row exhibits error maps between reconstructed point clouds and ground truth in terms of D1. In FIG. 10, the proposed method embodiment better reconstructs the pleats on the skirt with the least bpp, while the same regions are smoother with PCGCv2 and visible holes are introduced with PCGCv1. Although V-PCC achieves satisfactory reconstruction results in local regions at a higher bitrate, there are apparent cracks in the vertical middle due to the patch generation operations. While G-PCC (octree) leads to a massive loss of points, G-PCC (trisoup) yields comparable visualization results overall but produces cluttered protruding local areas. The visualization of the sequence 0520 also shows similar results in FIG. 11. Areas within the rectangles in the first row are zoomed-in in the second row. The final row exhibits error maps between reconstructed point clouds and ground truth in terms of D1. For instance, the proposed method embodiment reconstructs the clear shape of the nose and mouth, while the results from PCGCv2 are smoother with more holes. Additionally, there are obvious distortions on 3D block boundaries from PCGCv1 as it depends on cube partition of a point cloud during inference.

Figure 12:
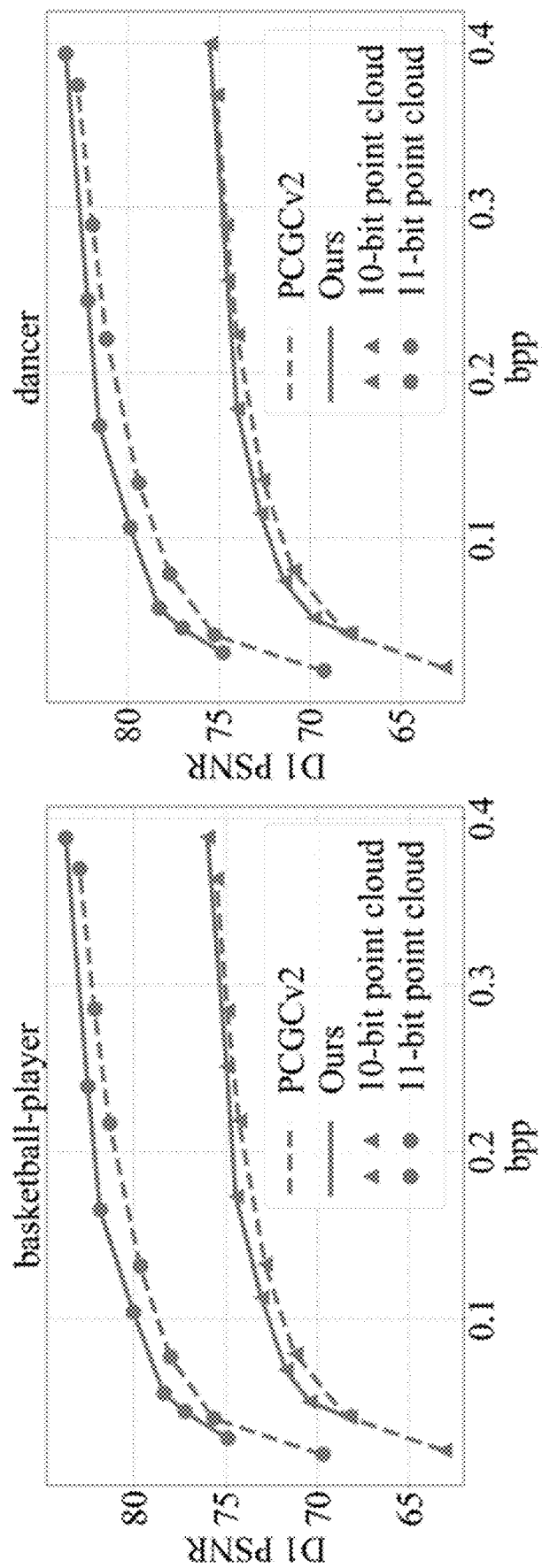
FIG. 12 shows example RD performance of the proposed method embodiment and PCGCv2 on sequences with different geometry precision.

4) Geometry Precision:

To further investigate the effectiveness of the proposed method embodiment, the performance to PCGCv2 using point clouds of the same sequences with different geometry precision levels are also compared, as shown in FIG. 12. It can be observed that the proposed scheme demonstrates improved coding performance for both 10-bit and 11-bit point clouds. More specifically, the proposed scheme gains 29.31% bit savings for an 11-bit point cloud basketball player and 19.08% for its 10-bit version compared to PCGCv2. This is because higher geometry precision booms the amount of data required to compress point clouds. These results are consistent with those shown in Tables IIA and IIB, where BD-Rate gains for the Owlii dataset are much higher than for other datasets. As human point clouds with higher geometry precision allow for larger and finer granularity of 3D coordinates, the method embodiment of the invention facilitates reconstructing high-accuracy human point clouds.

5) Runtime Comparisons:

The running time of the proposed method embodiment and other baseline approaches are further compared. The experiments are conducted on a server with an Intel Core i7-10700 CPU and a NVIDIA GeForce RTX 3090 GPU. Following [10], [49], the encoding and decoding time of all testing point clouds are computed at the highest bitrate level since the runtime of G-PCC varies at different bitrate levels. It is worth noting that traditional codecs G-PCC and V-PCC are applied using C++ with a CPU, while learning-based PCGCv2 and the proposed method are implemented using Python with a GPU. As a general indication of computational complexity, Table III shows that the proposed method increases encoding and decoding time compared to PCGCv2. This is because the proposed approach needs to perform additional mesh regression, mesh manipulation, mesh-to-point-cloud conversion, feature extraction, and feature warping in the encoder, and extra mesh manipulation and feature warping are executed in the decoder. The mesh regression and mesh-to-point-cloud conversion methods used are time-consuming, taking around 9.7 s and 1.9 s individually. The proposed approach can be further sped up with efficient mesh processing algorithms. Furthermore, it is worth mentioning that G-PCC (trisoup) is also based on surface sampling and its encoding time (16.101 s) and decoding time (13.207 s) are higher than the encoding time (13.30 s) and decoding time (2.76 s) of the proposed method.

TABLE III

THE AVERAGE RUNNING TIME (S) IN DIFFERENT APPROACHES IN THE EXPERIMENT

|      | G-PCC (octree) | G-PCC (trisoup) | V-PCC | PCGCv2 | Ours  |
|------|----------------|-----------------|-------|--------|-------|
| Enc. | 3.15           | 16.10           | 82.63 | 1.50   | 13.30 |
| Dec. | 1.1            | 13.21           | 2.09  | 0.77   | 2.76  |

The above embodiments have provided a deep human point cloud geometry compression scheme based on geometric priors. The proposed approach represents human point clouds as a combination of geometric priors and structure variations. By using geometric prior parameters which are quite compact, the proposed method is able to perform feature-level residual operations to remove geometry redundancy. The superior RD performance of the proposed scheme in one embodiment is demonstrated by comparing to traditional and learning-based methods on human point clouds from various datasets. It significantly reduces the rate while preserving the same level in terms of D1 and D2 PSNR. The proposed scheme in one embodiment also achieves improvement in visual quality with finer geometry details in local areas with the same bitrate.

The emergence of digital avatars has raised an exponential increase in the demand for human point clouds with realistic and intricate details. The compression of such data becomes challenging with overwhelming data amounts comprising millions of points. Some embodiments of the invention leverage the human geometric prior in geometry redundancy removal of point clouds, promoting the compression performance. More specifically, the prior provides topological constraints as geometry initialization, allowing adaptive adjustments with a compact parameter set that could be represented with only a few bits. Therefore, some embodiments of the invention can envisage high-resolution human point clouds as a combination of geometric priors and structural deviations. The priors could first be derived with an aligned point cloud, and subsequently the difference of features is compressed into a compact latent code. The proposed framework can operate in a play-and-plug fashion with existing learning based point cloud compression methods.

Some embodiments of the invention include one or more of the following unique features. For example, some embodiments of the invention include a human point cloud geometry compression method based on a geometric prior to achieve competitive coding performance in geometry redundancy removal of point clouds. For example, some embodiments of the invention a geometric prior based on human template model leveraged to provide topological constraints as geometry initialization, allowing adaptive adjustments with a compact parameter set that could be represented with only a few bits. For example, some embodiments of the invention envisage point clouds, such human point clouds, as a combination of a geometric prior and structural deviations. For example, some embodiments of the invention first derives the prior with an aligned point cloud, and subsequently compress the difference of features into a compact latent code. Some embodiments of the invention include one or more of other unique features not specifically described.

In some embodiments, the point cloud compression can leverage information from one or more predefined models. The predefined models may be human body deformable models. In one example, the predefined model may be skinned multi-person linear model (SMPL). In one example, the predefined model may be skinned multi-person linear model and hand model (SMPL-H). In one example, the predefined model may be skinned multi-person linear model with fully articulated hands and an expressive face (SMPL-X). The predefined models may be other deformable models. In one example, the predefined model may be 3D morphable face model (3DMM). In one example, the predefined model may be York ear model (YEM).

In some embodiments, the predefined models can be driven by a set of compact parameters. For example, the parameter set may include parameters control the shape of the predefined model. For example, the parameter set may include parameters control the pose of the predefined model. For example, the parameter set may include parameters control the rotation of the predefined model. For example, the parameter set may include parameters control the translation of the predefined model. For example, the parameter set may include parameters control the gender of the predefined model.

In some embodiments, the body modeling strategy and predefined models are available during encoding and decoding, herein only the parameter set needs to be encoded and conveyed by the corresponding bitstream. For example, the body modeling strategy provided by mesh recovery techniques from point clouds may be used. For example, the body modeling strategy provided by mesh recovery techniques from images may be used.

In some embodiments, the predefined models can be converted to point clouds via mesh-to-point-cloud conversion. For example, the mesh-to-point-cloud conversion provided by uniform sampling may be used. For example, the mesh-to-point-cloud conversion provided by Poisson sampling may be used.

In some embodiments, feature extraction is applied to extract high-level embeddings for both the source and aligned point clouds. The feature extraction may be based on deep learning techniques. For example, the deep learning technique is specified as sparse convolution. For example, the deep learning technique is specified as 3D convolutional neural network (CNN). For example, the deep learning technique is specified as multilayer perceptron (MLP). The feature extraction may be performed in a multiscale manner with n scales. For example, n may be 3. For example, n may be 4. For example, n may be 6.

In some embodiments, the feature warping module warps the features of a point cloud onto the coordinates of another point cloud. In one example, warping operation by a generalized sparse transposed convolution layer may be used. In one example, warping operation by a sparse transposed convolution layer may be used.

In some embodiments, the residual features are computed in the feature space. In one example, the residual feature computation may be performed by feature subtraction. In one example, the residual feature computation may be performed by concatenating features and outputting the residual in deep learning modules.

In some embodiments, in the decoder, the features are recovered by the operations of the residual feature and other features. The features may be recovered by the adding operation. For example, the feature adding operation may be performed by feature summation. For example, the feature adding operation may be performed by concatenating two features and outputting the reconstructed feature in deep learning module. The features may be recovered by combining the residual feature and other features. For example, other features may be a warped feature of a generated point cloud by warping on target coordinates. For example, other features may be an auxiliary feature of the source point cloud.

The main application of the invention is in point cloud geometry compression. Embodiments of the invention provide a framework for point cloud geometry compression based on a geometric prior. One example advantage of some embodiments of the invention lies in representing human point clouds as a combination of a geometric prior and structure variations. By using geometric prior parameters which are quite compact, some embodiments of the invention is able to perform feature-level residual operations to remove geometry redundancy. Some embodiments of the invention are versatile and can be applied in a plug-and-play fashion by swapping out the feature extraction and warping modules with a variety of approaches.

System

Figure 4:
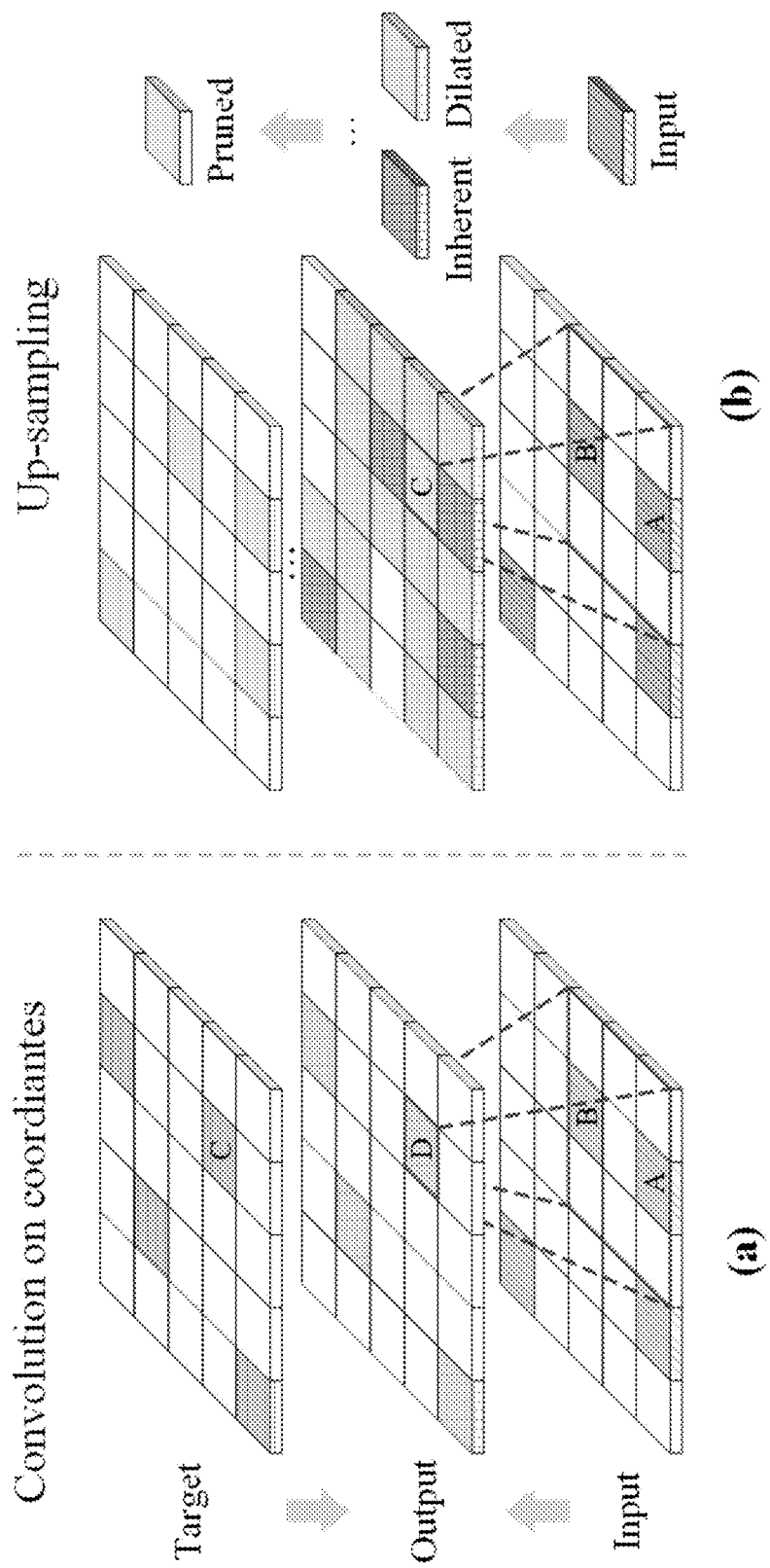
FIG. 4 shows an example 2D illustration of components in feature warping and feature propagation modules, that includes (a) the convolution on coordinates layer in feature warping, and (b) an up-sampling block in feature propagation, according to an embodiment of the invention.
Figure 13:
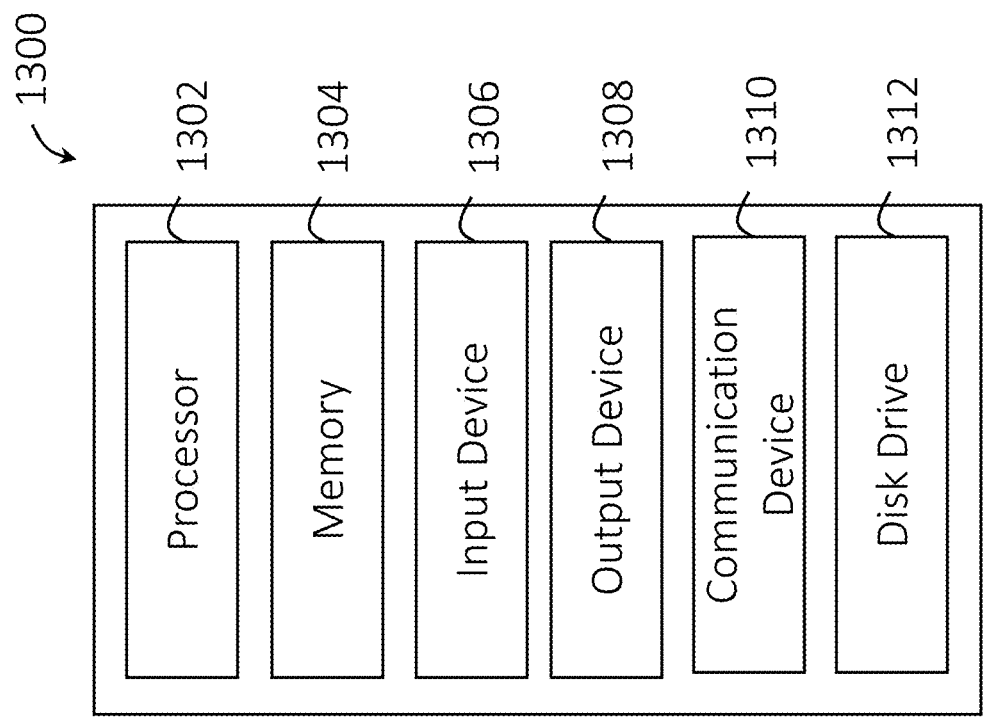
FIG. 13 shows an example information handling system in some embodiments of the invention.

FIG. 13 shows an example information handling system 1300 that can be used to perform one or more of the methods for a learning-based point cloud geometry compression in embodiments of the invention (including the embodiments in FIGS. 2, 3, and 4). The information handling system 1300 generally comprises suitable components necessary to receive, store, and execute appropriate computer instructions, commands, and/or codes. The main components of the information handling system 1300 are a processor 1302 and a memory (storage) 1304. The processor 1302 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1304 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1304. Computer instructions for executing or facilitating executing the method embodiments of the invention may be stored in the memory 1304. The processor 1302 and memory (storage) 1304 may be integrated or separated (and operably connected). Optionally, the information handling system 1300 further includes one or more input devices 1306. Example of such input device 1306 include: keyboard, mouse, stylus, image scanner, microphone, tactile/touch input device (e.g., touch sensitive screen), image/video input device (e.g., camera), etc. Optionally, the information handling system 1300 further includes one or more output devices 1308. Example of such output device 1308 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1300 may further include one or more disk drives 1312 which may include one or more of: solid state drive, hard disk drive, optical drive, flash drive, magnetic tape drive, etc. A suitable operating system may be installed in the information handling system 1300, e.g., on the disk drive 1312 or in the memory 1304. The memory 1304 and the disk drive 1312 may be operated by the processor 1302. Optionally, the information handling system 1300 also includes a communication device 1310 for establishing one or more communication links (not shown) with one or more other computing devices, such as servers, personal computers, terminals, tablets, phones, watches, IoT devices, or other wireless computing devices. The communication device 1310 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1302, the memory 1304 (optionally the input device(s) 1306, the output device(s) 1308, the communication device(s) 1310 and the disk drive(s) 1312, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 1300 shown in FIG. 13 is merely an example and that the information handling system 1300 can in other embodiments have different configurations (e.g., include additional components, has fewer components, etc.).

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). While some embodiments relate to human point clouds, it should be appreciated that methods/framework of the invention can be applied to other point clouds (not limited to human point clouds).

REFERENCES

[1] E. d'Eon, B. Harrison, T. Myers, and P. A. Chou, "8i voxelized full bodies (a voxelized point cloud dataset)," ISO/IEC JTC1/SC29/WG11, Geneva, Tech. Rep. M40059/M74006, January 2017.

[2] D. Graziosi, O. Nakagami, S. Kuma, A. Zaghetto, T. Suzuki, and A. Tabatabai, "An overview of ongoing point cloud compression stan-dardization activities: Video-based (V-PCC) and geometry-based (G-PCC)," APSIPA Trans. Signal Inf. Process., vol. 9, p. e13, 2020.

[3] S. Schwarz, M. Preda, V. Baroncini, M. Budagavi, P. Ce'sar, P. A. Chou, R. A. Cohen, M. Krivokuca, S. Lasserre, Z. Li, J. Llach, K. Mammou, R. Mekuria, O. Nakagami, E. Siahaan, A. J. Tabatabai, A. M. Tourapis, and V. Zakharchenko, "Emerging mpeg standards for point cloud compression," IEEE J. Emerg. Sel. Topics Circuits Syst., vol. 9, no. 1, pp. 133-148, 2019.

[4] MPEG 3D Graphics Coding, "V-PCC codec description," ISO/IEC JTC 1/SC 29/WG 7, Tech. Rep. N00100, October 2020.

[5] MPEG 3D Graphics Coding, "G-PCC codec description," ISO/IEC JTC 1/SC 29/WG 7, Tech. Rep. N0099, April 2021.

[6] G. J. Sullivan, J. Ohm, W. Han, and T. Wiegand, "Overview of the high efficiency video coding (HEVC) standard," IEEE Trans. Circuits Syst. Video Technol., vol. 22, no. 12, pp. 1649-1668, 2012.

[7] J. Balle', V. Laparra, and E. P. Simoncelli, "End-to-end optimized image compression," in 5th Int. Conf Learn. Representations (ICLR), 2017.

[8] J. Balle', D. Minnen, S. Singh, S. J. Hwang, and N. Johnston, "Variational image compression with a scale hyperprior," in 6th Int. Conf Learn. Representations (ICLR), 2018.

[9] M. Quach, G. Valenzise, and F. Dufaux, "Learning convolutional trans-forms for lossy point cloud geometry compression," in IEEE Int. Conf. Image Process. (ICIP), 2019, pp. 4320-4324.

[10] J. Wang, D. Ding, Z. Li, and Z. Ma, "Multiscale point cloud geometry compression," in 31st Data Compression Conf. (DCC), 2021, pp. 73-82.

[11] J. Wang, D. Ding, Z. Li, X. Feng, C. Cao, and Z. Ma, "Sparse tensor-based multiscale representation for point cloud geometry compression," IEEE Trans. Pattern Anal. Mach. Intell., pp. 1-18, 2022.

[12] R. Mekuria, K. Blom, and P. Cesar, "Design, implementation, and evaluation of a point cloud codec for tele-immersive video," IEEE Trans. Circuits Syst. Video Technol., vol. 27, no. 4, pp. 828-842, 2016.

[13] E. Ramalho, E. Peixoto, and E. Medeiros, "Silhouette 4d with context selection: Lossless geometry compression of dynamic point clouds," IEEE Signal Process. Lett., vol. 28, pp. 1660-1664, 2021.

[14] E. Peixoto, "Intra-frame compression of point cloud geometry using dyadic decomposition," IEEE Signal Process. Lett., vol. 27, pp. 246-250, 2020.

[15] X. Zhang, W. Gao, and S. Liu, "Implicit geometry partition for point cloud compression," in Data Compression Conf (DCC), 2020, pp. 73-82.

[16] C. Wang, W. Zhu, Y. Xu, Y. Xu, and L. Yang, "Point-voting based point cloud geometry compression," in 23rd Int. Workshop Multimedia Signal Process. (MMSP), 2021, pp. 1-5.

[17] A. Ahmmed, M. Paul, M. M. Murshed, and D. Taubman, "Dynamic point cloud geometry compression using cuboid based commonality modeling framework," in 2021 IEEE Int. Conf. Image Process. (ICIP), 2021, pp. 2159-2163.

[18] L. Li, Z. Li, S. Liu, and H. Li, "Efficient projected frame padding for video-based point cloud compression," IEEE Trans. Multimedia, vol. 23, pp. 2806-2819, 2021.

[19] L. Li, Z. Li, V. Zakharchenko, J. Chen, and H. Li, "Advanced 3d motion prediction for video-based dynamic point cloud compression," IEEE Trans. Image Process., vol. 29, pp. 289-302, 2020.

[20] J. Xiong, H. Gao, M. Wang, H. Li, K. N. Ngan, and W. Lin, "Efficient geometry surface coding in v-pcc," IEEE Trans. Multimedia, pp. 1-1, 2022.

[21] P. de Oliveira Rente, C. Brites, J. Ascenso, and F. Pereira, "Graph-based static 3d point clouds geometry coding," IEEE Trans. Multimedia, vol. 21, no. 2, pp. 284-299, 2019.

[22] W. Zhu, Y. Xu, D. Ding, Z. Ma, and M. Nilsson, "Lossy point cloud geometry compression via region-wise processing," IEEE Trans. Circuits Syst. Video Technol., vol. 31, no. 12, pp. 4575-4589, 2021.

[23] W. Zhu, Z. Ma, Y. Xu, L. Li, and Z. Li, "View-dependent dynamic point cloud compression," IEEE Trans. Circuits Syst. Video Technol., vol. 31, no. 2, pp. 765-781, 2021.

[24] M. Krivokuca, P. A. Chou, and M. Koroteev, "A volumetric approach to point cloud compression-part II: geometry compression," IEEE Trans. Image Process., vol. 29, pp. 2217-2229, 2020.

[25] R. L. de Queiroz and P. A. Chou, "Motion-compensated compression of dynamic voxelized point clouds," IEEE Trans. Image Process., vol. 26, no. 8, pp. 3886-3895, 2017.

[26] D. C. Garcia, T. A. da Fonseca, R. U. Ferreira, and R. L. de Queiroz, "Geometry coding for dynamic voxelized point clouds using octrees and multiple contexts," IEEE Trans. Image Process., vol. 29, pp. 313-322, 2020.

[27] D. Thanou, P. A. Chou, and P. Frossard, "Graph-based compression of dynamic 3d point cloud sequences," IEEE Trans. Image Process., vol. 25, no. 4, pp. 1765-1778, 2016.

[28] L. Huang, S. Wang, K. Wong, J. Liu, and R. Urtasun, "Octsqueeze: Octree-structured entropy model for lidar compression," in IEEE Int. Conf Comput. Vision Pattern Recognit. (CVPR), 2020, pp. 1310-1320.

[29] Z. Que, G. Lu, and D. Xu, "Voxelcontext-net: An octree based frame-work for point cloud compression," in IEEE Int. Conf. Comput. Vision Pattern Recognit. (CVPR), 2021, pp. 6042-6051.

[30] C. Fu, G. Li, R. Song, W. Gao, and S. Liu, "Octattention: Octree-based large-scale contexts model for point cloud compression," in 36th AAAI Conf. Artif Intell. (AAAI), 2022, pp. 625-633.

[31] T. Fan, L. Gao, Y. Xu, D. Wang, and Z. Li, "Multiscale latent-guided entropy model for lidar point cloud compression," arXiv:2209.12512, 2022.

[32] S. Biswas, J. Liu, K. Wong, S. Wang, and R. Urtasun, "Muscle: Multi sweep compression of lidar using deep entropy models," in Conf. Neural Inf. Process. Syst. (NeurIPS), 2020.

[33] Z. Hu, G. Lu, and D. Xu, "FVC: A new framework towards deep video compression in feature space," in IEEE Int. Conf. Comput. Vision Pattern Recognit. (CVPR), 2021, pp. 1502-1511.

[34] G. Lu, W. Ouyang, D. Xu, X. Zhang, C. Cai, and Z. Gao, "DVC: an end-to-end deep video compression framework," in IEEE Int. Conf. Comput. Vision Pattern Recognit. (CVPR), 2019, pp. 11 006-11 015.

[35] M. Quach, G. Valenzise, and F. Dufaux, "Improved deep point cloud geometry compression," in 22nd Int. Workshop Multimedia Signal Process. (MMSP), 2020, pp. 1-6.

[36] D. T. Nguyen, M. Quach, G. Valenzise, and P. Duhamel, "Learning-based lossless compression of 3d point cloud geometry," in IEEE Int. Conf Acoustics Speech Signal Process. (ICASSP), 2021, pp. 4220-4224.

[37] D. T. Nguyen, M. Quach, Giuseppe Valenzise, and P. Duhamel, "Multi-scale deep context modeling for lossless point cloud geometry compres-sion," in IEEE Int. Conf. Multimedia Expo Workshops (ICMEW), 2021, pp. 1-6.

[38] A. F. R. Guarda, N. M. M. Rodrigues, and F. Pereira, "Deep learning-based point cloud geometry coding with resolution scalability," in 22nd Int. Workshop Multimedia Signal Process. (MMSP), 2020, pp. 1-6.

[39] A. F. R. Guarda, N. M. M. Rodrigues, and F. Pereira, "Point cloud geometry scalable coding with a single end-to-end deep learning model," in IEEE Int. Conf Image Process. (ICIP), 2020, pp. 3354-3358.

[40] A. F. R. Guarda, N. M. M. Rodrigues, and F. Pereira, "Deep Learning-Based Point Cloud Geometry Coding: RD Control Through Implicit and Explicit Quantization," in IEEE Int. Conf. Multimedia Expo Workshops (ICMEW), 2020, pp. 1-6.

[41] S. Milani, "ADAE: adversarial distributed source autoencoder for point cloud compression," in IEEE Int. Conf Image Process. (ICIP), 2021, pp. 3078-3082.

[42] J. Wang, H. Zhu, H. Liu, and Z. Ma, "Lossy point cloud geometry compression via end-to-end learning," IEEE Trans. Circuits Syst. Video Technol., vol. 31, no. 12, pp. 4909-4923, 2021.

[43] A. Brock, T. Lim, J. M. Ritchie, and N. Weston, "Generative and discriminative voxel modeling with convolutional neural networks," arXiv: 1608.04236, 2016.

[44] R. Xue, J. Wang, and Z. Ma, "Efficient lidar point cloud geometry compression through neighborhood point attention," arXiv:2208.12573, 2022.

[45] Z. Liang and F. Liang, "Transpcc: Towards deep point cloud compression via transformers," in ICMR '22: International Conference on Multimedia Retrieval, Newark, NJ, USA, Jun. 27-30, 2022, 2022, pp. 1-5.

[46] Y. He, X. Ren, D. Tang, Y. Zhang, X. Xue, and Y. Fu, "Density-preserving deep point cloud compression," in IEEE Int. Conf Comput. Vision Pattern Recognit. (CVPR), 2022, pp. 2323-2332.

[47] M. A. A. Muzaddid and W. J. Beksi, "Variable rate compression for raw 3d point clouds," in Int. Conf Robot. Autom. (ICRA), 2022, pp. 8748-8755.

[48] K. You and P. Gao, "Patch-based deep autoencoder for point cloud geometry compression," in ACM Multimedia Asia, 2021, pp. 30:1-30:7.

[49] A. Akhtar, Z. Li, and G. V. der Auwera, "Inter-frame compression for dynamic point cloud geometry coding," arXiv:2207.12554, 2022.

[50] T. Fan, L. Gao, Y. Xu, Z. Li, and D. Wang, "D-DPCC: deep dynamic point cloud compression via 3d motion prediction," in 31st Int. Joint Conf Artif Intell. (IJCAI), 2022, pp. 898-904.

[51] W. Yang, Z. Chen, C. Chen, G. Chen, and K. K. Wong, "Deep face video inpainting via UV mapping," IEEE Trans. Image Process., vol. 32, pp. 1145-1157, 2023.

[52] J. Lin, Y. Yuan, T. Shao, and K. Zhou, "Towards high-fidelity 3d face reconstruction from in-the-wild images using graph convolutional networks," in IEEE Int. Conf. Comput. Vision Pattern Recognit. (CVPR), 2020, pp. 5890-5899.

[53] F. Wimbauer, S. Wu, and C. Rupprecht, "De-rendering 3d objects in the wild," in IEEE Int. Conf. Comput. Vision Pattern Recognit. (CVPR), 2022, pp. 18 469-18 478.

[54] X. Zuo, S. Wang, Q. Sun, M. Gong, and L. Cheng, "Self-supervised 3D Human Mesh Recovery from Noisy Point Clouds." arXiv:2107.07539, 2021.

[55] B. Chen, Z. Wang, B. Li, S. Wang, S. Wang, and Y. Ye, "Interactive face video coding: A generative compression framework," arXiv:2302.09919, 2023.

[56] R. Hanocka, G. Metzer, R. Giryes, and D. Cohen-Or, "Point2mesh: a self-prior for deformable meshes," ACM Trans. Graph., vol. 39, no. 4, p. 126, 2020.

[57] X. Wei, Z. Chen, Y. Fu, Z. Cui, and Y. Zhang, "Deep hybrid self-prior for full 3d mesh generation," in IEEE/CVF Int. Conf. Computer Vision (ICCV), 2021, pp. 5785-5794.

[58] D. Smirnov, M. Bessmeltsev, and J. Solomon, "Learning manifold patch-based representations of man-made shapes," in 9th Int. Conf. Learn. Representations (ICLR), 2021.

[59] M. Loper, N. Mahmood, J. Romero, G. Pons-Moll, and M. J. Black, "SMPL: a skinned multi-person linear model," ACM Trans. Graph., vol. 34, no. 6, pp. 248:1-248:16, 2015.

[60] C. Xu, Y. Makihara, X. Li, and Y. Yagi, "Occlusion-aware human mesh model-based gait recognition," IEEE Trans. Inf. Forensics Secur., vol. 18, pp. 1309-1321, 2023.

[61] C. R. Qi, L. Yi, H. Su, and L. J. Guibas, "Pointnet++: Deep hierarchical feature learning on point sets in a metric space," in Conf Neural Inf. Process. Syst. (NeurIPS), 2017, pp. 5099-5108.

[62] B. Graham, M. Engelcke, and L. van der Maaten, "3d semantic seg-mentation with submanifold sparse convolutional networks," in IEEE Int. Conf Comput. Vision Pattern Recognit. (CVPR), 2018, pp. 9224-9232.

[63] C. B. Choy, J. Gwak, and S. Savarese, "4d spatio-temporal convnets: Minkowski convolutional neural networks," in IEEE Int. Conf Comput. Vision Pattern Recognit. (CVPR), 2019, pp. 3075-3084.

[64] J. Gwak, C. B. Choy, and S. Savarese, "Generative sparse detection networks for 3d single-shot object detection," in 16th European Conf Computer Vision (ECCV), vol. 12349, 2020, pp. 297-313.

[65] D. Minnen, J. Balle', and G. Toderici, "Joint autoregressive and hierarchi-cal priors for learned image compression," in Conf Neural Inf. Process. Syst. (NeurIPS), 2018, pp. 10 794-10 803.
[66] Y. Xu, Y. Lu, and Z. Wen, "Owlii dynamic human mesh sequence dataset," ISO/IEC JTC1/SC29 WG11, Macau, Tech. Rep. M41658, October 2017.
[67] T. Yu, Z. Zheng, K. Guo, P. Liu, Q. Dai, and Y. Liu, "Function4d: Real-time human volumetric capture from very sparse consumer RGBD sensors," in IEEE Int. Conf. Comput. Vision Pattern Recognit. (CVPR), 2021, pp. 5746-5756.
[68] M. Krivokuc'a, P. A. Chou, and P. Savill, "8i voxelized surface light field (8iVSLF) dataset," ISO/IEC JTC1/SC29 WG11, Ljubljana, Tech. Rep. M42914, July 2018.
[69] 3DG, "Common test conditions for V3C and V-PCC," ISO/IEC JTC 1/SC 29/WG 11, Tech. Rep. N19518, July 2020.
[70] 3DG, "Common test conditions for G-PCC," ISO/IEC JTC 1/SC 29/WG 11, Tech. Rep. N19584, July 2020.

The invention claimed is:

1. A method for learning-based point cloud geometry compression, comprising:
given a source point cloud, regressing an aligned mesh that is driven by a set of parameters from a deformable template mesh;
quantizing the set of parameters into a parameter bitstream;
generating an aligned point cloud from the quantized parameters by mesh manipulation and mesh-to-point-cloud conversion;
extracting features from the source point cloud to provide features of the source point cloud and extracting features from the aligned point cloud to provide features of the aligned point cloud based on sparse tensors comprising coordinates and features, the coordinates being encoded into a coordinate bitstream;
warping the features of the aligned point cloud onto the coordinates of the source point cloud to provide warped features of the aligned point cloud;
obtaining residual features through feature subtraction;
processing the residual features using an entropy model into a residual feature bitstream; and
obtaining a reconstructed point cloud by processing the parameter bitstream, the coordinate bitstream and the residual feature bitstream.

2. The method of claim 1, wherein generating the aligned point cloud comprises:
recovering the aligned mesh from the quantized parameters in the mesh manipulation; and
processing the aligned mesh by mesh-to-point-cloud conversion.

3. The method of claim 1, wherein extracting the features from both the source point cloud and the aligned point cloud comprises using stacked downsampling blocks.

4. The method of claim 3, wherein each downsampling block comprises a strided convolution unit, a Voxception-ResNet (VRN) unit, and another convolution layer, arranged in a cascading manner.

5. The method of claim 3, wherein using the stacked downsampling blocks outputs multiscale sparse tensors.

6. The method of claim 1, wherein the feature extraction and the feature warping can be applied in a plug-and-play fashion with one or more methods.

7. The method of claim 6, wherein the one or more methods for the feature extraction and the feature warping comprises a method based on a deep point cloud compression using sparse convolution.

8. The method of claim 1, wherein obtaining the residual features comprises subtracting the warped features of the aligned point cloud from the features of the source point cloud to obtain the residual features.

9. The method of claim 1, wherein the residual features have entropy, and processing the residual features comprises compressing the residual features by vector quantization on original signal space and estimating the entropy of the residual features.

10. The method of claim 1, wherein obtaining the reconstructed point cloud comprises:
decoding the parameter bitstream to use the set of parameters to manipulate the deformable template mesh;
producing an aligned point cloud by mesh-to-point-cloud conversion from a reconstructed aligned mesh;
predicting features from the aligned point cloud;
warping the predicted features onto a decoded set of coordinates corresponding to skeleton points of a source point cloud;
decoding the residual feature bitstream to the residual features; and
adding the residual features to the obtained warped features to recover the features of the source point cloud.

11. The method of claim 10, wherein obtaining the reconstructed point cloud further comprises conducting feature propagation on the recovered features of the source point cloud to upscale points of the recovered features of the source point cloud close to the source point cloud.

12. The method of claim 11, wherein conducting the feature propagation comprises employing a transposed convolution layer with a two-stride in each upsampling block to upscale an input coordinate set while retaining its sparsity pattern.

13. A system for learning-based point cloud geometry compression, comprising:
one or more processors; and
memory storing one or more programs configured to be executed by the one or more processors, the one or more programs including instructions for performing or facilitating performing of the method of claim 1.

14. A non-transitory computer readable medium having instructions stored thereon which, when executed by one or more processors, cause the one or more processors to execute the method of claim 1.

* * * * *